US010262590B2

(12) United States Patent
Fujikawa

(10) Patent No.: US 10,262,590 B2
(45) Date of Patent: Apr. 16, 2019

(54) ACTIVE MATRIX SUBSTRATE AND DISPLAY PANEL

(71) Applicant: SHARP KABUSHIKI KAISHA, Sakai, Osaka (JP)

(72) Inventor: Yohsuke Fujikawa, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/747,062

(22) PCT Filed: Jul. 28, 2016

(86) PCT No.: PCT/JP2016/072160
§ 371 (c)(1),
(2) Date: Jan. 23, 2018

(87) PCT Pub. No.: WO2017/022620
PCT Pub. Date: Feb. 9, 2017

(65) Prior Publication Data
US 2018/0374422 A1 Dec. 27, 2018

(30) Foreign Application Priority Data
Aug. 3, 2015 (JP) .................................. 2015-153423

(51) Int. Cl.
G09G 3/20 (2006.01)
G09G 3/3233 (2016.01)
(Continued)

(52) U.S. Cl.
CPC ......... *G09G 3/3233* (2013.01); *G02F 1/1345* (2013.01); *G02F 1/1362* (2013.01);
(Continued)

(58) Field of Classification Search
CPC ......... G09G 3/20; G09G 3/3233; G09G 5/003
(Continued)

(56) References Cited

U.S. PATENT DOCUMENTS

2003/0076282 A1\* 4/2003 Ikeda .................. G09G 3/3648
345/55
2013/0141314 A1 6/2013 Ka et al.
(Continued)

FOREIGN PATENT DOCUMENTS

JP 2013-117709 A 6/2013
JP 2013-160965 A 8/2013
(Continued)

*Primary Examiner* — Calvin C Ma
(74) *Attorney, Agent, or Firm* — ScienBiziP, P.C.

(57) ABSTRACT

An array substrate includes pixels PX, source wires, a first column circuit portion connected to the source wires, first column connection wires connected to the first column circuit portion, a second column circuit portion, panel-side input terminal portions, second column connection wires, and diagonally arrayed circuit portions. The second column circuit portion includes unit circuits connected to the first column connection wires. Some of the panel-side input terminal portions are displaced in the row direction with respect to the corresponding unit circuits. The second column connection wires include second diagonally extending portions extending from the unit circuits to the panel-side input terminal portions. The diagonally arrayed circuit portions include the unit circuits disposed such that the closer to the middle of the second circuit portion with respect to the row direction, the closer to the first column circuit portion with respect to the column direction.

12 Claims, 18 Drawing Sheets

(51) Int. Cl.
*G02F 1/1345* (2006.01)
*G09G 3/36* (2006.01)
*G09G 3/00* (2006.01)
*G09G 3/3275* (2016.01)
*G02F 1/1362* (2006.01)

(52) U.S. Cl.
CPC .......... *G09G 3/006* (2013.01); *G09G 3/3275* (2013.01); *G09G 3/3648* (2013.01)

(58) Field of Classification Search
USPC ........................................ 345/55, 204, 690
See application file for complete search history.

(56) References Cited

U.S. PATENT DOCUMENTS

2013/0328840 A1  12/2013  Fujikawa
2016/0118605 A1*  4/2016  Kawakami .......... H01L 51/0025
257/40

FOREIGN PATENT DOCUMENTS

WO  2008/053622 A1  5/2008
WO  2012/115052 A1  8/2012

\* cited by examiner

ACTIVE MATRIX SUBSTRATE AND DISPLAY PANEL

TECHNICAL FIELD

The present invention relates to an active matrix substrate and a display panel.

BACKGROUND ART

A display device equipped with a display panel, such as a liquid crystal panel, is used in portable information terminal devices such as cell phone, smartphone, and tablet notebook computer, and electronic devices such as computer, for example. Examples of the display device are described in Patent Documents 1 and 2 below.

Patent Document 1 describes a display device including an element array area in which display elements are arrayed in a matrix, an RGB switch circuit which includes a plurality of sampling units for time-division driving the element array area sequentially for each of a plurality of columns, and a video signal protection circuit which includes a plurality of video signal protection units arrayed at an array pitch smaller than the array pitch of the sampling units.

Patent Document 2 describes a display device which includes a display area; a frame area around the display area; a terminal area along one side of the display area in the frame area; a mounting area along the one side of the display area at a part of the terminal area; a source control circuit including an array of a plurality of unit circuits provided for each of a predetermined number of a plurality of adjacent source signal lines in the frame area between the display area and the mounting area; and a plurality of video signal lines which extend in parallel with each other from the plurality of unit circuits in the frame area along the terminal area in a direction intersecting the one side of the display area at a predetermined angle, whereupon the video signal lines further extend in parallel with each other in a direction orthogonal to the one side of the display area until reaching the mounting area. At least some of the plurality of unit circuits are arrayed while being displaced toward the display area in the order along the direction in which the video signal lines extend at the predetermined angle.

PRIOR ART DOCUMENT

Patent Document

Patent Document 1: WO 2008053622 (A1)
Patent Document 2: Japanese Unexamined Patent Publication No. 2013-160965

Problem to be Solved by the Invention

In Patent Document 1, a margin area is created by arraying the video signal protection units at a smaller pitch than the sampling unit. However, there is a limit to how narrow the frame can be made due to an arrangement space related to wires for connecting the video signal protection units and a source driver IC.

In Patent Document 2, a certain decrease in frame size is achieved by arraying at least some of a plurality of unit circuits with displacements toward the display area in the order along the direction in which the video signal lines extend at a predetermined angle. However, the size in the longitudinal direction of the source control circuit tends to vary depending on the size in the lateral direction of the unit circuits. Accordingly, the size in the longitudinal direction of the source control circuit may be increased depending on the design, resulting in a failure to achieve a decrease in frame size. In addition, because the arrangement space in the lateral direction for the source control circuit occupies a large portion of the frame area, it has been difficult to ensure a space at the corners of the frame area for installing various wires and circuit and the like, which are becoming increasingly larger as a result of increases in resolution and size.

DISCLOSURE OF THE PRESENT INVENTION

The present invention has been made in view of the foregoing circumstances, and an object of the present invention is to achieve a decrease in frame size and an increase in resolution, for example.

Means for Solving the Problem

An active matrix substrate according to the present invention includes a plurality of pixels arrayed in a matrix along a row direction and a column direction; a plurality of column wires connected to the plurality of pixels disposed side by side along the column direction; a first column circuit portion extending along the row direction and connected to the plurality of column wires; a plurality of first column connection wires connected to the first column circuit portion; a second column circuit portion disposed so as to sandwich the first column circuit portion with the plurality of pixels, and including a plurality of unit circuits respectively connected to the plurality of first column connection wires; a plurality of signal input portions disposed so as to sandwich the second column circuit portion with the first column circuit portion, and configured to input a signal to the second column circuit portion, the plurality of signal input portions including a signal input portion that is displaced in the row direction with respect to the unit circuit to be connected; a plurality of second column connection wires respectively connected to the plurality of unit circuit of the second column circuit portion and to the plurality of signal input portions, and including at least a diagonally extending portion extending, from the unit circuit side toward the signal input portion side to be connected, along a direction intersecting the row direction and the column direction; and a diagonally arrayed circuit portion including at least some of the plurality of unit circuits of the second column circuit portion being arranged side by side along a direction intersecting the row direction and the column direction, the diagonally arrayed circuit portion including the plurality of unit circuits arrayed such that the closer the unit circuits on the side of the unit circuits to be connected with the diagonally extending portion become to the signal input portion side in the row direction, the closer the unit circuits become to the first column circuit portion with respect to the column direction.

When the signal from the signal input portion is input to the second column circuit portion via the second column connection wires, the signal is input to the first column circuit portion via the first column connection wires and then supplied to the plurality of pixels via the column wires. At least some of the plurality of unit pixels of the second column circuit portion are disposed side by side along the direction intersecting the row direction and the column direction, whereby the diagonally arrayed circuit portion is configured. The diagonally arrayed circuit portion includes the plurality of unit circuits arrayed such that the closer the unit circuits on the side of the unit circuits to be connected with the diagonally extending portion become to the signal input portion side in the row direction, the closer the unit circuits become to the first column circuit portion with respect to the column direction. Accordingly, compared with the case where the plurality of unit circuits are arrayed straight along the row direction, the angle formed by the diagonally extending portion of the second column connection wires, connecting the second column circuit portion and the signal input portion, with respect to the row direction can be decreased. In this way, the arrangement space for the second column connection wires with respect to the column direction is decreased, whereby a decrease in frame size of the active matrix substrate can be achieved.

In addition, because the second column circuit portion is separated from the first column circuit portion, the first column circuit portion can be prevented from restricting the row direction size of the second column circuit portion. Accordingly, the row direction size of the second column circuit portion can be easily decreased. When the row direction size of the second column circuit portion is decreased, the space on the outside in the row direction with respect to the second column circuit portion on the active matrix substrate can be effectively utilized. For example, it becomes possible to install various wires and circuit and the like, which tend to increase as a result of an increase in resolution or size, in the space. This is preferable from the viewpoint of achieving an increase in resolution and size. Thus, because various wires and circuit can be installed in the space on the outside in the row direction with respect to the second column circuit portion on the active matrix substrate, there is no need to install the various wires and circuit on the outside in the row direction with respect to the first column circuit portion. Accordingly, the row direction size of the first column circuit portion can be increased and the column direction size can be decreased, whereby the arrangement space for the first column circuit portion with respect to the column direction is decreased. As a result, a further decrease in frame size of the active matrix substrate can be achieved.

Preferable embodiments of the active matrix substrate according to the present invention include the following.

(1) The first column circuit portion and the second column circuit portion each may have a correlation such that a size in the row direction and a size in the column direction are discretely inversely proportional to each other. The second column circuit portion may have a relatively gentler discrete change concerning the row direction size and the column direction size than the first column circuit portion. In this way, because the second column circuit portion has a relatively gentle discrete change concerning the row direction size and the column direction size, a decrease in the row direction size does not readily lead to an increase in the column direction size. That "the discrete change is gentle" may be understood to mean that, when the layout of a circuit of interest is viewed in plan, 1) the space between adjacent wires is wide; 2) the space between wires and transistors is wide; and 3) wires themselves are thick and therefore can be made thinner. Accordingly, the space on the outside in the row direction with respect to the second column circuit portion on the active matrix substrate can be effectively utilized. In addition, the arrangement space for the second column circuit portion with respect to the column direction can be decreased, which is preferable for decreasing the frame size of the active matrix substrate. On the other hand, while the first column circuit portion has a relatively steep discrete change concerning the row direction size and the column direction size, there is no need to install various wires and circuit on the outside in the row direction with respect to the first column circuit portion. Thus, the row direction size of the first column circuit portion can be made sufficiently large, whereby the arrangement space with respect to the column direction can be maintained to be small. In this way, a decrease in frame size of the active matrix substrate can be achieved in a more preferable manner.

(2) The first column circuit portion may include a switch circuit for allocating a signal to the plurality of column wires respectively connected the plurality of pixels disposed side by side along the row direction. While the switch circuit tends to have a steep discrete change concerning the row direction size and the column direction size, there is no need to install various wires and circuit on the outside in the row direction with respect to the first column circuit portion including the switch circuit. Accordingly, the row direction size of the first column circuit portion can be made sufficiently large, whereby the arrangement space with respect to the column direction can be maintained to be small. In this way, a decrease in frame size of the active matrix substrate can be achieved in a preferable manner.

(3) The switch circuit may include a plurality of unit switches disposed side by side linearly along the row direction, and the unit switches may have a size in the row direction that is equal to a pitch between the plurality of pixels disposed side by side along the row direction. In this way, the row direction size of the unit switch is sufficiently increased, and the function of the unit switch can be performed with high reliability, which is more preferable for achieving an increase in resolution. In addition, the row direction size of the unit switch is equal to the pitch of the plurality of pixels disposed side by side along the row direction. Accordingly, by aligning the positional relationship between the unit switches and the column wires in the row direction, for example, the routing path of the column wires connected to the pixels and the unit switches can be simplified.

(4) The second column circuit portion may include at least one of a test circuit configured to supply a test signal to the first column circuit portion, and a protection circuit for protecting the first column circuit portion from a surge current. The test circuit and the protection circuit both tend to have a gentle discrete change concerning the row direction size and the column direction size. Accordingly, a decrease in the row direction size does not readily lead to an increase in the column direction size. Accordingly, the space on the outside in the row direction with respect to the second column circuit portion on the active matrix substrate can be effectively utilized. In addition, the arrangement space for the second column circuit portion with respect to the column direction can be decreased, whereby a decrease in frame size of the active matrix substrate can be achieved in a preferable manner.

(5) The second column circuit portion may include both the test circuit and the protection circuit. Because the second column circuit portion includes both the test circuit and the protection circuit and is thereby provided with multi-functionality, there is no need to provide a test circuit or a protection circuit other than the second column circuit portion. Accordingly, a decrease in frame size of the active matrix substrate can be achieved in a preferable manner. In addition, a decrease in the row direction size in the second column circuit portion including both the test circuit and the protection circuit does not readily lead to an increase in the column direction size.

(6) The second column circuit portion may include one of the test circuit and the protection circuit. In this way, the column direction size of the second column circuit portion can be further decreased in a preferable manner, whereby a decrease in frame size of the active matrix substrate can be achieved in a preferable manner.

(7) The second column circuit portion may include the test circuit selectively, and the second column connection wires may be made of a material with a higher resistance value than the first column connection wires. In this way, the second column connection wires are made of a material with a higher resistance value than the first column connection wires. Accordingly, even if a surge current is input to the signal input portion, the surge current passes through the second column connection wires and is sufficiently attenuated before reaching the second column circuit portion. Accordingly, even in the configuration in which the second column circuit portion does not include the protection circuit and includes the test circuit selectively, the function for protecting the second column circuit portion can be obtained. Because the second column connection wires provide the function for protecting the second column circuit portion, there is no need to provide a protection circuit separately from the second column connection wires. Thus, a decrease in frame size of the active matrix substrate can be achieved in a preferable manner.

(8) The first column circuit portion may include a test circuit configured to supply a test signal to the plurality of pixels, and the second column circuit portion may include a protection circuit for protecting the first column circuit portion from a surge current. In his way, because the test circuit and the protection circuit both tend to have a gentle discrete change concerning the row direction size and the column direction size, a decrease in the row direction size does not readily lead to an increase in the column direction size. Because the protection circuit is included in the second column circuit portion, the space on the outside in the row direction with respect to the second column circuit portion on the active matrix substrate can effectively utilized. In addition, the arrangement space for the second column circuit portion with respect to the column direction can be decreased, and a decrease in frame size of the active matrix substrate can be achieved in a preferable manner. Meanwhile, because the column direction size of the first column circuit portion including the test circuit is also maintained sufficiently small, a decrease in frame size of the active matrix substrate can be achieved in a preferable manner.

(9) A pair of diagonally arrayed circuit portions may be provided with an interval therebetween in the row direction. The plurality of unit circuits may be arrayed symmetrically. A straight array circuit portion may be interposed between the pair of diagonally arrayed circuit portions with respect to the row direction. At least some of the plurality of unit circuits of the second column circuit portion may be arranged linearly side by side along the row direction. In this way, the arrangement freedom of the plurality of signal input portions to be connected to the plurality of unit circuits of the straight array circuit portion, and the layout freedom of the plurality of second column connection wires connected to the plurality of unit circuits of the straight array circuit portion are both increased. For example, the plurality of signal input portions can be arranged at regular intervals along the row direction, or the plurality of signal input portions can be arranged in two groups with an interval in the row direction. In accordance with such arrangements of the signal input portion, the layout of the plurality of second column connection wires can be modified as appropriate. In this way, a variety of components connected to the plurality of signal input portions can be handled in a preferable manner.

(10) The active matrix substrate may include a first column control wire which is connected to the first column circuit portion and to which a first column control signal is transmitted; a first column control signal input portion which is connected to the first column control wire and to which the first column control signal is input; a second column control wire which is connected to the second column circuit portion and to which a second column control signal is transmitted; a second column control signal input portion which is connected to the second column control wires and to which the second column control signal is input; and a control wire protection circuit portion which is provided along the routing of the first column control wire and the second column control wire to protect the first column circuit portion and the second column circuit portion from a surge current, the control wire protection circuit portion being disposed side by side along the row direction with respect to the second column circuit portion. In this way, even if a surge current is input to the first column control signal input portion or the second column control signal input portion, the first column circuit portion and the second column circuit portion can be protected from the surge current by the control wire protection circuit portion provided along the routing of the first column control wires and the second column control wires. The control wire protection circuit portion is disposed side by side along the row direction with respect to the second column circuit portion, and is not arranged side by side along the row direction with respect to the first column circuit portion. Accordingly, the row direction size of the first column circuit portion can be made sufficiently large, whereby the column direction size of the first column circuit portion can be maintained to be small. In this way, a decrease in frame size of the active matrix substrate can be achieved in a preferable manner.

In order to solve the problem, a display panel according to the present invention includes the active matrix substrate and a counter substrate bonded to the active matrix substrate. In the display panel of this configuration, a decrease in frame size of the active matrix substrate and an increase in resolution and the like are achieved. Accordingly, the display quality of the image displayed on the display panel can be increased, and sophisticated design can be obtained.

Advantageous Effect of the Invention

According to the present invention, a decrease in frame size and an increase in resolution and the like can be achieved.

BEST MODE FOR CARRYING OUT THE INVENTION

<First embodiment>

Figure 1:
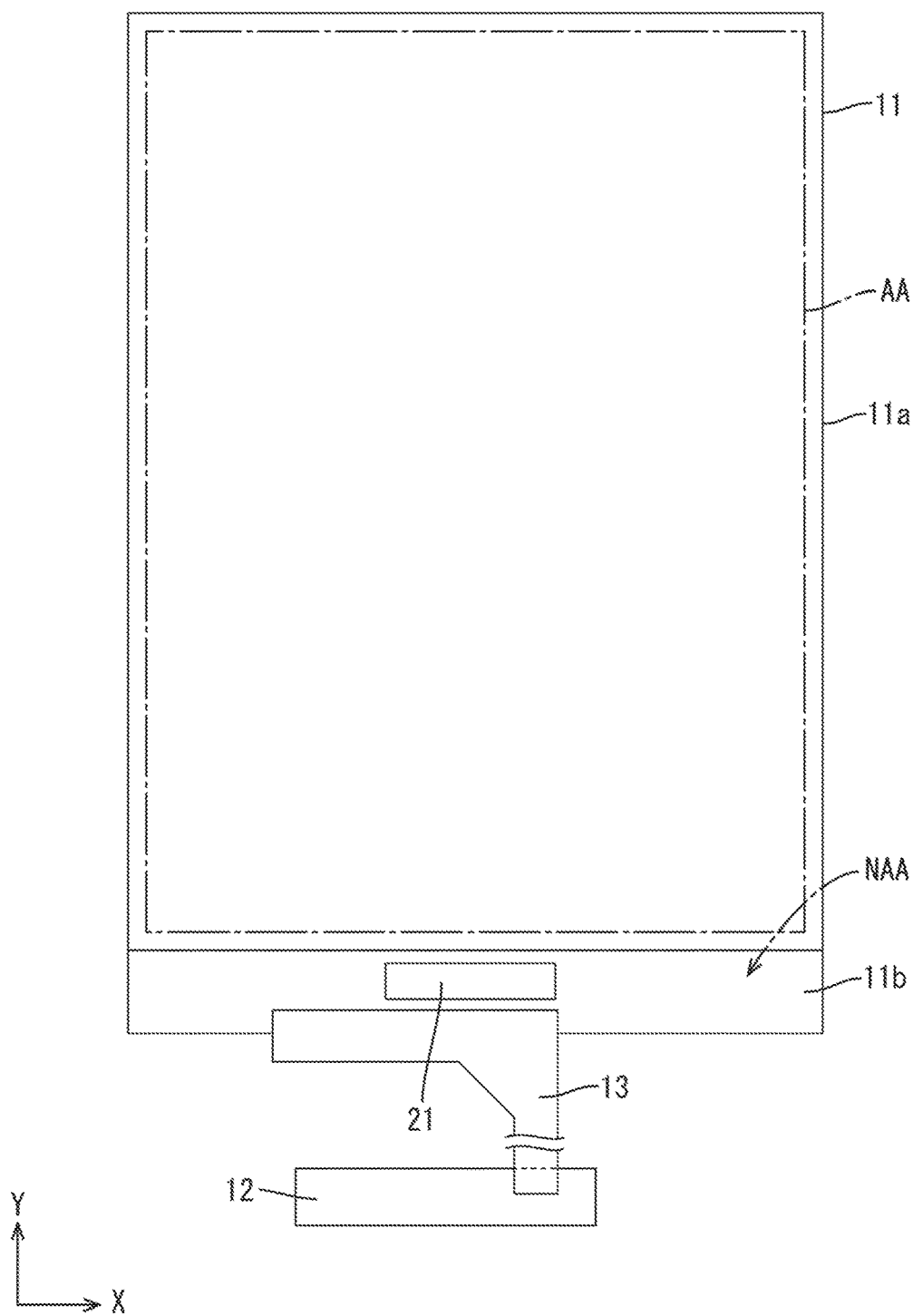
FIG. 1 is a schematic plan view illustrating a connection configuration for a liquid crystal panel having a driver according to the first embodiment of the present invention mounted thereto, a flexible substrate, and a control circuit substrate.

A first embodiment of the present invention will be described with reference to FIG. 1 to FIG. 13. In the present embodiment, a liquid crystal display device 10 will be exemplified. In some of the drawings, an X-axis, a Y-axis, and a Z-axis are indicated, and the respective axial directions are drawn to correspond to the directions indicated in the drawings. With respect to upper and lower directions, reference is made to FIG. 2, for example, in which the top corresponds to a front side and the bottom corresponds to a back side.

Figure 2:
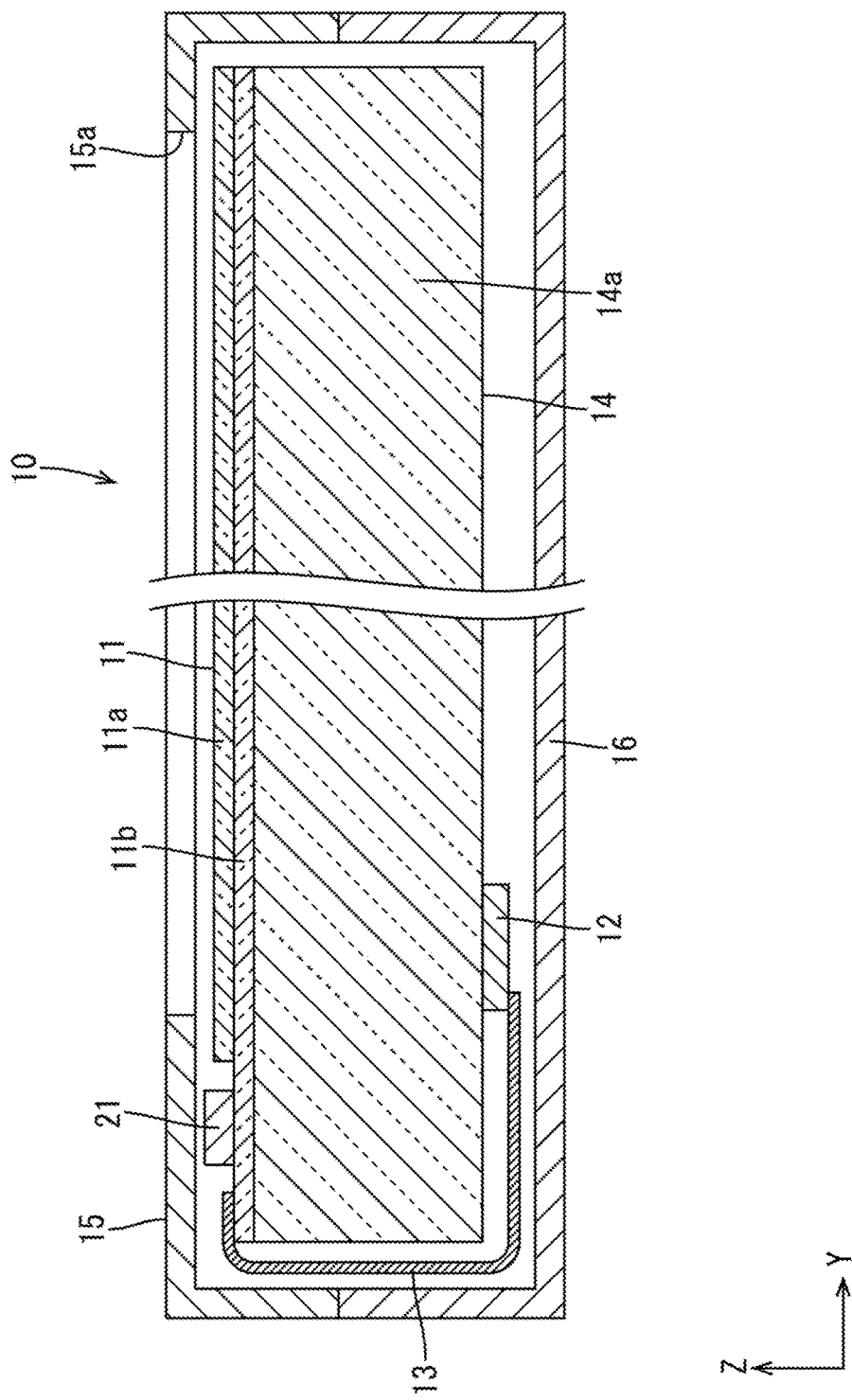
FIG. 2 is a schematic cross sectional diagram illustrating a cross sectional configuration along a long side direction of a liquid crystal display device.

The liquid crystal display device 10, as illustrated in FIG. 1 and FIG. 2, is provided with: a liquid crystal panel (display panel) 11 including a display portion AA in which an image can be displayed and a non-display portion NAA outside the display portion AA; a driver (display element drive portion; pixel drive portion) 21 which drives the liquid crystal panel 11; a control circuit substrate (external signal supply source) 12 which externally supplies various input signals to the driver 21; a flexible substrate (external connection component) 13 electrically connecting the liquid crystal panel 11 and the external control circuit substrate 12; and a backlight device (lighting device) 14 which is an external light source for supplying light to the liquid crystal panel 11. The liquid crystal display device 10 is also provided with a pair of front and back exterior members 15, 16 for housing and holding the liquid crystal panel 11 and the backlight device 14 assembled to each other. The exterior member 15 on the front side has an opening portion 15a formed therein for external viewing of an image displayed in the display portion AA of the liquid crystal panel 11. The liquid crystal display device 10 according to the present embodiment may be used in various electronic devices (not illustrated), such as cell phone (including smartphones), notebook computer (including tablet notebook computers), wearable terminal (including smart watches), portable information terminal (including e-book and PDA), portable game machine, and digital photo frame. Thus, the liquid crystal panel 11 of the liquid crystal display device 10 has a screen size on the order of several inches to a dozen or so inches, which would be generally categorized into small or medium-small size.

The backlight device 14 will be briefly described. The backlight device 14, as illustrated in FIG. 2, is provided with: a substantially box-shaped chassis 14a which opens to the front side (liquid crystal panel 11 side); a light source (such as a cold cathode tube, LED, or organic EL), not illustrated, which is provided in the chassis 14a; and an optical member, not illustrated, which is provided so as to cover the opening portion of the chassis 14a. The optical member has the function of converting the light emitted from the light source into planar light, for example.

The liquid crystal panel 11 will be described. The liquid crystal panel 11, as illustrated in FIG. 1, has a generally elongated quadrangular shape (rectangular shape). The display portion (active area, display area) AA is provided at a position closer to one end side (upper side in FIG. 1) in the long side direction of the liquid crystal panel 11. The driver 21 and the flexible substrate 13 are attached at positions closer to the other end side (lower side in FIG. 1) in the long side direction of the liquid crystal panel 11. In the liquid crystal panel 11, the area outside the display portion AA provides a non-display portion (non-active area; non-display area) NAA in which no image is displayed. The non-display portion NAA includes a substantially frame-shaped area (a frame portion of a CF substrate 11a which will be described later) which encloses the display portion AA, and an area secured in the other end side of the long side direction (a portion of the array substrate 11b that is not superimposed with the CF substrate 11a and is exposed, as will be described later). The area secured on the other end side in the long side direction includes the areas for mounting the driver 21 and the flexible substrate 13 (attachment area). The short-side direction of the liquid crystal panel 11 corresponds to the X-axis direction in the drawings, and the long side direction corresponds to Y-axis direction in the drawings. In FIG. 1, the frame-shaped dashed and single-dotted line slightly smaller than the CF substrate 11a indicates the outer shape of the display portion AA. The area outside the solid line provides the non-display portion NAA.

Figure 3:
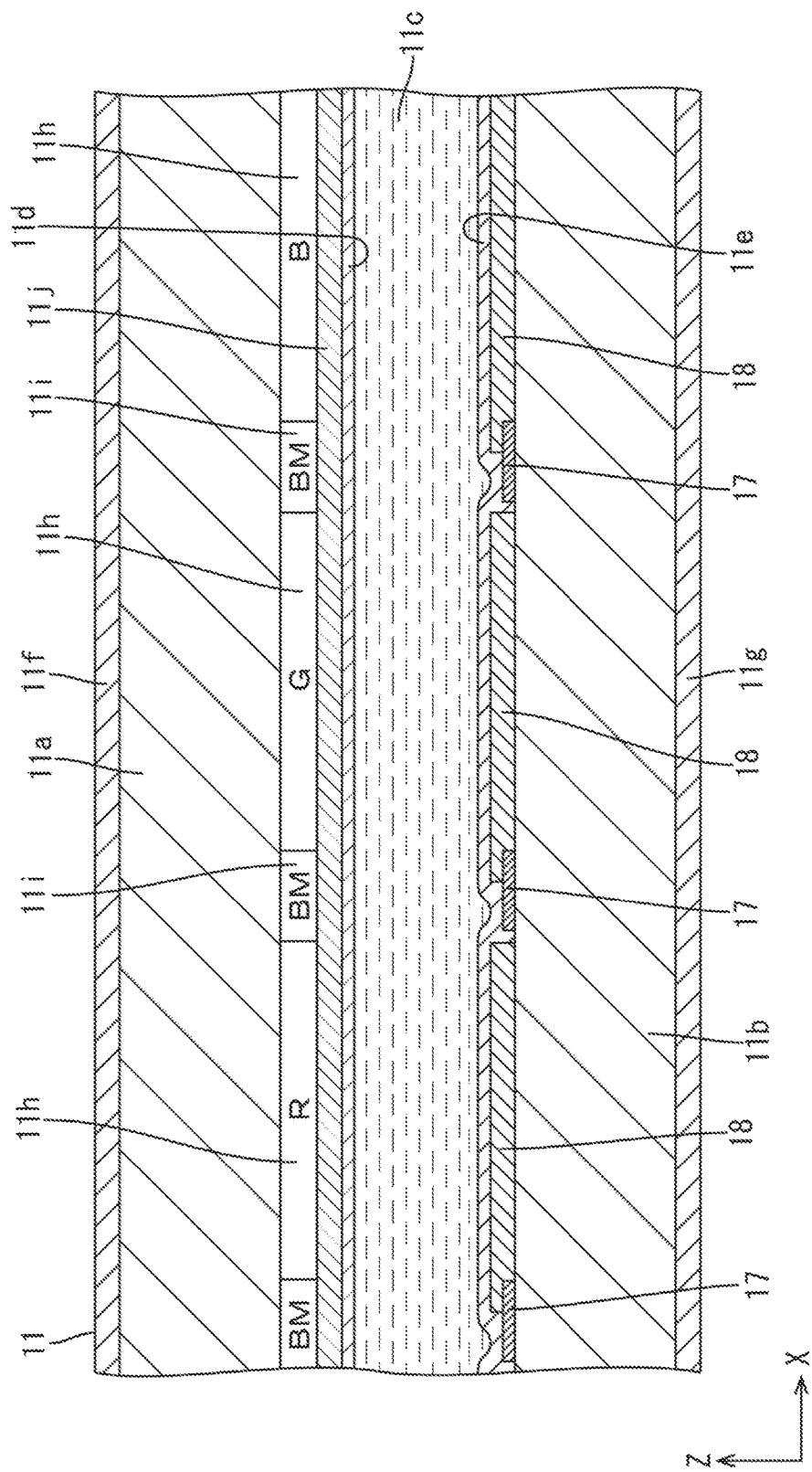
FIG. 3 is a schematic cross sectional diagram illustrating a cross sectional configuration of a liquid crystal panel.

The liquid crystal panel 11, as illustrated in FIG. 3, is provided with a pair of transparent (optically transmissive) glass substrates 11a, 11b, and a liquid crystal layer 11c which is interposed between the substrates 11a, 11b and includes liquid crystal molecules of a substance of which the optical characteristics can be varied by electric field application. The substrates 11a, 11b are bonded to each other by means of a sealant, not illustrated, with a gap corresponding to the thickness of the liquid crystal layer 11c maintained therebetween. The substrates 11a, 11b include a CF substrate (counter substrate) 11a which is on the front side (front surface side), and an array substrate (active matrix substrate; element substrate) 11b which is on the back side (rear surface side). The CF substrate 11a, as illustrated in FIG. 1 and FIG. 2, is generally equivalent to the array substrate 11b in short-side dimension, and is smaller than the array substrate 11b in long side dimension. The CF substrate 11a is bonded to the array substrate 11b with their end portions on one side in the long side direction (upper side in FIG. 1) being aligned. Accordingly, the other end portion (lower side in FIG. 1) in the long side direction of the array substrate 11b does not overlap with the CF substrate 11a over a predetermined range, and has front and back plate surfaces externally exposed. In the exposed surfaces, the mounting areas for the driver 21 and the flexible substrate 13 (arrangement area for terminal portions 22 to 24) are secured, as will be described later. On the inner surface side of each of the substrates 11a, 11b, alignment films 11d, 11e are respectively formed for aligning the liquid crystal molecules included in the liquid crystal layer 11c. To the outer surface side of each of the substrates 11a, 11b, polarizing plates 11f, 11g are respectively affixed.

Figure 4:
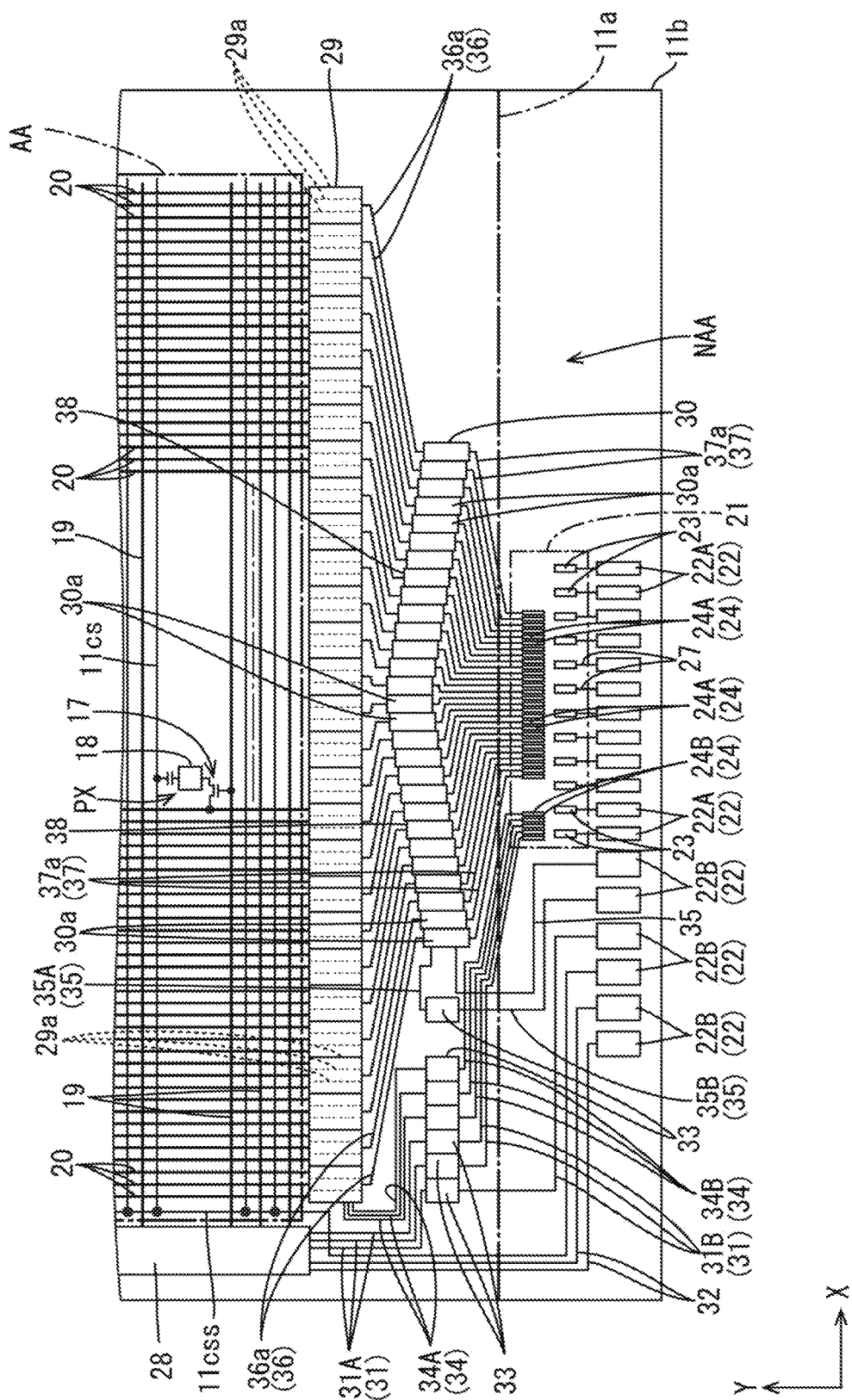
FIG. 4 is a plan view illustrating a configuration of wires and the like in a portion of an array substrate which constitutes the liquid crystal panel in which a driver and a flexible substrate are mounted.

The configurations of the array substrate 11b and the CF substrate 11a within the display portion AA will be described in order. On the inner surface side (liquid crystal layer 11c side; the side of the surface opposite the CF substrate 11a) of the array substrate 11b, as illustrated in FIG. 3 and FIG. 4, a number of thin-film transistors (TFT) 17 which are switching elements (display elements), and a number of pixel electrodes 18 are provided side by side in a matrix. Around the TFTs 17 and the pixel electrodes 18, a grid of gate wires (row wires, row control lines, scan lines) 19 and source wires (column wires, column control lines, data lines) 20 is disposed. In other words, at the intersections of the arid of gate wires 19 and source wires 20, the TFTs 17 and the pixel electrodes 18 are arranged side by side along the row direction (X-axis direction) and the column direction (Y-axis direction) in a matrix (matrix shape).

The gate wires 19 and the source wires 20, as illustrated in FIG. 4, are each made of metal material (electrically conductive material). Between the intersecting portions of the gate wires 19 and the source wires 20, an insulating film, not illustrated, is interposed. A plurality of capacitance wires (Cs wires) 11cs are provided which are disposed in parallel with the gate wires 19 and which intersect and are superimposed with the pixel electrodes 18 via an insulating film so as to form an auxiliary capacitance (Cs capacitance) with the pixel electrodes 18. The capacitance wires 11cs are made of the same metal material as the gate wires 19, and are disposed side by side alternately with the gate wires 19 with respect to the Y-axis direction. One end portions of the plurality of capacitance wires 11cs are respectively connected to capacitance trunk wires 11css which extend along the column direction in a position adjacent to a row circuit portion 28, as will be described later. The gate wires 19 and the source wires 20 are respectively connected to the gate electrodes and source electrodes of the TFTs 17. The pixel electrodes 18 are connected to the drain electrodes of the TFTs 17. The gate wires 19, the gate electrodes, and the capacitance wires 11cs are made of a first metal film (gate metal) which is provided on a relatively lower-layer side (glass substrate side). On the other hand, the source wires 19, the source electrodes, the drain electrodes, and the capacitance trunk wires 11css are made of a second metal film (source metal) which is provided on a relatively upper-layer side via the insulating film with respect to the first metal film. For the first metal film, a metal material with a high melting point and large sheet resistance, such as Ta (tantalum) or W (tungsten), is used. For the second metal film, a metal material which may be susceptible to corrosion but has low sheet resistance, such as Al (aluminum) or Cr (chromium), is used. The first metal film and the second metal film may have a single-layer structure or a laminate structure formed by laminating a plurality of metal layers.

The TFTs 17, as illustrated in FIG. 4, have a semiconductor film disposed between the source electrode and the drain electrode to enable the transfer of electrons therebetween. The semiconductor film is made of a continuous grain (CG) silicon thin film which is a type of polycrystalline silicon thin film. The CG silicon thin film is formed by, for example, adding a metal material in an amorphous silicon thin film and performing a thermal treatment at a low temperature of not more than 550° C. for a short period of time so that the atomic arrangement at the crystal grain boundary of the silicon crystal has continuity. The CG silicon thin film, compared with an amorphous silicon thin film and the like, has high electron mobility on the order of 200 to 300 cm$^2$/Vs, for example. Accordingly, the TFTs 17 can be easily miniaturized, and amount of light transmitted by the pixel electrodes 18 can be maximized, which is preferable for achieving an increase in resolution and a decrease in power consumption. The TFTs 17 with the semiconductor film are of the staggered type (coplanar type) in which the semiconductor film is disposed in the lowermost layer, on the upper-layer side of which the gate electrode is laminated via an insulating film. The pixel electrodes 18 in plan view have an elongated quadrangular shape (rectangular shape), and are made of a transparent electrode material, such as indium tin oxide (ITO) or zinc oxide (ZnO).

The CF substrate 11a, as illustrated in FIG. 3, is provided with a color filter 11h including three colors of colored portions of red (R), green (G), and blue (B). A plurality of each of the colored portions of the color filter 11h are arrayed side by side in a matrix (matrix shape) along the row direction (X-axis direction) and the column direction (Y-axis direction), and are respectively arranged so as to be superimposed with the pixel electrodes 18 on the array substrate 11b side in plan view. Between the colored portions constituting the color filter 11h, a substantially grid-shaped light-blocking layer (black matrix) 11i is formed to prevent mixing of the colors. The light-blocking layer 11i is arranged so as to be superimposed with the gate wires 19 and the source wires 20 in plan view. On the surface of the color filter 11h and the light-blocking layer 11i, a solid counter electrode 11j is provided opposing the pixel electrodes 18 on the array substrate 11b side.

The pixel electrodes 18 provided on the array substrate 11b and the TFTs 17 connected to the pixel electrodes 18 configure pixels PX, as illustrated in FIG. 3 and FIG. 4. The pixels PX exhibit colors corresponding to the colored portions of the color filter 11h opposing the pixel electrodes 18 of the pixels PX. Accordingly, the pixels PX include those that exhibit the color of red (red pixel), those that exhibit the color of green (green pixel), and those that exhibit the color of blue (blue pixel). The pixels PX configure a single display unit, and a plurality of the pixels PX are repeatedly arrayed side by side in a matrix (matrix shape) along the row direction (X-axis direction) and the column direction (Y-axis direction). Of a number of pixels PX arrayed in a matrix, a plurality of pixels PX disposed side by side along the row direction are connected to the same gate wire 19 to configure a pixel row. A plurality of pixels PX disposed side by side along the column direction are connected to the same source wire 20 to configure a pixel column. Accordingly, the TFTs 17 of the pixels PX constituting the pixel row are supplied with a scan signal from the same gate wire 19. On the other hand, the TFTs 17 of the pixels PX constituting the pixel column are supplied with an image signal (data signal, video signal) from the same source wire 20. A plurality of the pixel rows are disposed side by side along the column direction. A plurality of the pixel columns are disposed side by side along the row direction. A plurality of adjacent pixels PX constituting a pixel row have different colors, while a plurality of adjacent pixels PX constituting a pixel column have the same color. In FIG. 4, only one pixel PX is illustrated as a representative example in a simplified form.

The control circuit substrate 12, as illustrated in FIG. 1 and FIG. 2, is attached to the back surface (the outer surface on the opposite side from the liquid crystal panel 11 side) of the chassis 14*a* of the backlight device 14 using screws and the like. The control circuit substrate 12 includes a substrate made of phenolic paper or glass epoxy resin. On the substrate, electronic components for supplying various input signals to the driver 21 are mounted, and a predetermined pattern of wires (electrically conductive paths), not illustrated, are routed and formed. To the control circuit substrate 12, one end portion (one end side) of the flexible substrate 13 which is not illustrated is electrically and mechanically connected via an anisotropic conductive film (ACF).

The flexible substrate (FPC substrate) 13, as illustrated in FIG. 2, includes a base member made of an insulating and flexible synthetic resin material (such as polyimide resin). The base member has a number of wire patterns (not illustrated) provided thereon. As described above, one end portion of the flexible substrate 13 with respect to the length direction is connected to the control circuit substrate 12 provided on the back surface side of the chassis 14*a*. The other end portion (the other end side) of the flexible substrate 13 is connected to the array substrate 11*b* of the liquid crystal panel 11. Thus, in the liquid crystal display device 10, the flexible substrate 13 has a cross sectional shape that is bent in substantially U-shape. At the end portions of the flexible substrate 13 with respect to the length direction, the wire patterns are externally exposed, forming terminal portions (not illustrated). The terminal portions are respectively electrically connected to the control circuit substrate 12 and the array substrate 11*b*. In this way, it is made possible to transmit an input signal supplied from the control circuit substrate 12 side to the liquid crystal panel 11 side.

The driver 21, as illustrated in FIG. 1, includes an LSI chip having a drive circuit. The driver 21 operates on the basis of a signal supplied from the control circuit substrate 12 serving as a signal supply source. The driver 21 processes the input signal supplied from the control circuit substrate 12 serving as the signal supply source, generates an output signal, and outputs the output signal to the display portion AA of the liquid crystal panel 11. The driver 21 in plan view has an oblong quadrangular shape (longitudinal along the short side of the liquid crystal panel 11), and is directly mounted to the non-display portion NAA of the array substrate 11*b* of the liquid crystal panel 11 in a chip on glass (COG) fashion. The long side direction of the driver 21 corresponds to the X-axis direction (the short-side direction of the liquid crystal panel 11). The short-side direction of the driver 21 corresponds to the Y-axis direction (the long side direction of the liquid crystal panel 11).

Connection structures of the flexible substrate 13 and the driver 21 with respect to the non-display portion NAA of the array substrate 11*b* will be described. To a non-superimposed portion of the non-display portion NAA of the array substrate 11*b* that is not superimposed over the CF substrate 11*a*, as illustrated in FIG. 1, an end portion of the flexible substrate 13 and the driver 21 are attached. The end portion of the flexible substrate 13 is provided at the end portion along the short-side direction (X-axis direction) of the array substrate 11*b*. The driver 21 disposed on the display portion AA side on the array substrate 11*b* with respect to the flexible substrate 13. In other words, the driver 21 is disposed in a position in the non-display portion NAA that is sandwiched between the display portion AA and the flexible substrate 13. On the other hand, the flexible substrate 13 has the end portion (attachment portion with respect to the liquid crystal panel 11) disposed on the opposite side from the display portion AA side with respect to the driver 21. In the non-display portion NAA of the array substrate 11*b*, between the flexible substrate 13 and the driver 21, and between the driver and the display portion AA, predetermined intervals are respectively provided with respect to the long side direction of the array substrate 11*b* (the short-side direction of the driver 21, Y-axis direction). The flexible substrate 13 has the end portion attached at around the center on the short-side side of the end portion of the array substrate 11*b*, the attached end portion of the flexible substrate 13 extending along the end portion on the short-side side (short-side direction, X-axis direction) of the array substrate 11*b*. The end portion of the flexible substrate 13 attached to the array substrate 11*b* has a dimension smaller than a short-side dimension of the array substrate 11*b*. On the other hand, the driver 21 is mounted in the non-display portion NAA at around the center of the array substrate 11*b* with respect to the short-side direction, with the long side direction of the driver 21 being aligned with the short-side direction of the array substrate 11*b* (X-axis direction). The driver 21 is arranged eccentrically with respect to the flexible substrate 13 in the short-side direction of the array substrate 11*b*. The driver 21 has a long side dimension smaller than a length dimension of the end portion of the flexible substrate 13 attached to the array substrate 11*b*.

In the mounting area of the array substrate 11*b* for the flexible substrate 13 (external connection member mounting area), as illustrated in FIG. 4, an external connection terminal portions 22 for receiving the supply of input signal from the flexible substrate 13 side is formed. In the mounting area of the array substrate 11*b* for the driver 21 (display element drive portion mounting area, pixel drive portion mounting area), a panel-side output terminal portions 23 for outputting a signal to the driver 21, and a panel-side input terminal portion (signal input portion) 24 to which a signal from the driver 21 is input are provided. Some of the external connection terminal portions 22 and the panel-side output terminal portions 23 are electrically connected by connection wires 27 routed and formed across an area of the non-display portion NAA between the mounting area for the flexible substrate 13 and the mounting area for the driver 21. The driver 21 includes a driver-side input terminal portion (display element drive portion-side signal input portion) 25 electrically connected to the panel-side output terminal portions 23, and a driver-side output terminal portion (display element drive portion-side output terminal portion) 26 electrically connected to the panel-side input terminal portions 24. In FIG. 4, the flexible substrate 13 and the driver 21 are indicated by dashed and double-dotted lines. In FIG. 4, the dashed and single-dotted lines enclosing a group of wires for display including the gate wires 19, the source wires 20, and the capacitance wires lies indicate the outer shape of the display portion AA, where the area outside the dashed and single-dotted line corresponds to the non-display portion NAA. Further, in FIG. 4, the outer shape of the other end portion of the CF substrate 11a adjacent to the driver 21 on the upper side thereof is indicated by a dashed and single-dotted line.

The external connection terminal portions 22, the panel-side output terminal portions 23, the panel-side input terminal portions 24, and the connection wires 27, as illustrated in FIG. 4, are made of the same first metal film as that of the gate wires 19, for example, and their surfaces are covered with the same transparent electrode material as that of the pixel electrodes 18, such as ITO or ZnO. Accordingly, the external connection terminal portions 22, the panel-side output terminal portions 23, the panel-side input terminal portions 24, and the connection wires 27 are patterned on the array substrate 11b by known photolithography process, simultaneously when the gate wires 19 and the pixel electrodes 18 are patterned during the manufacturing process of the liquid crystal panel 11 (array substrate 11b). The external connection terminal portions 22 include a plurality of driver external connection terminal portions 22A connected to the panel-side output terminal portions 23 via the connection wires 27 to supply signals to the driver 21, and a plurality of non-driver external connection terminal portions 22B for portions other than the driver 21, for supplying power supply power and the like to a row circuit portion 28 and column circuit portions 29, 30, which will be described later, and the capacitance trunk wires 11css. The non-driver external connection terminal portions 22B include those which are directly connected to the capacitance trunk wires 11css to supply power.

Figure 5:
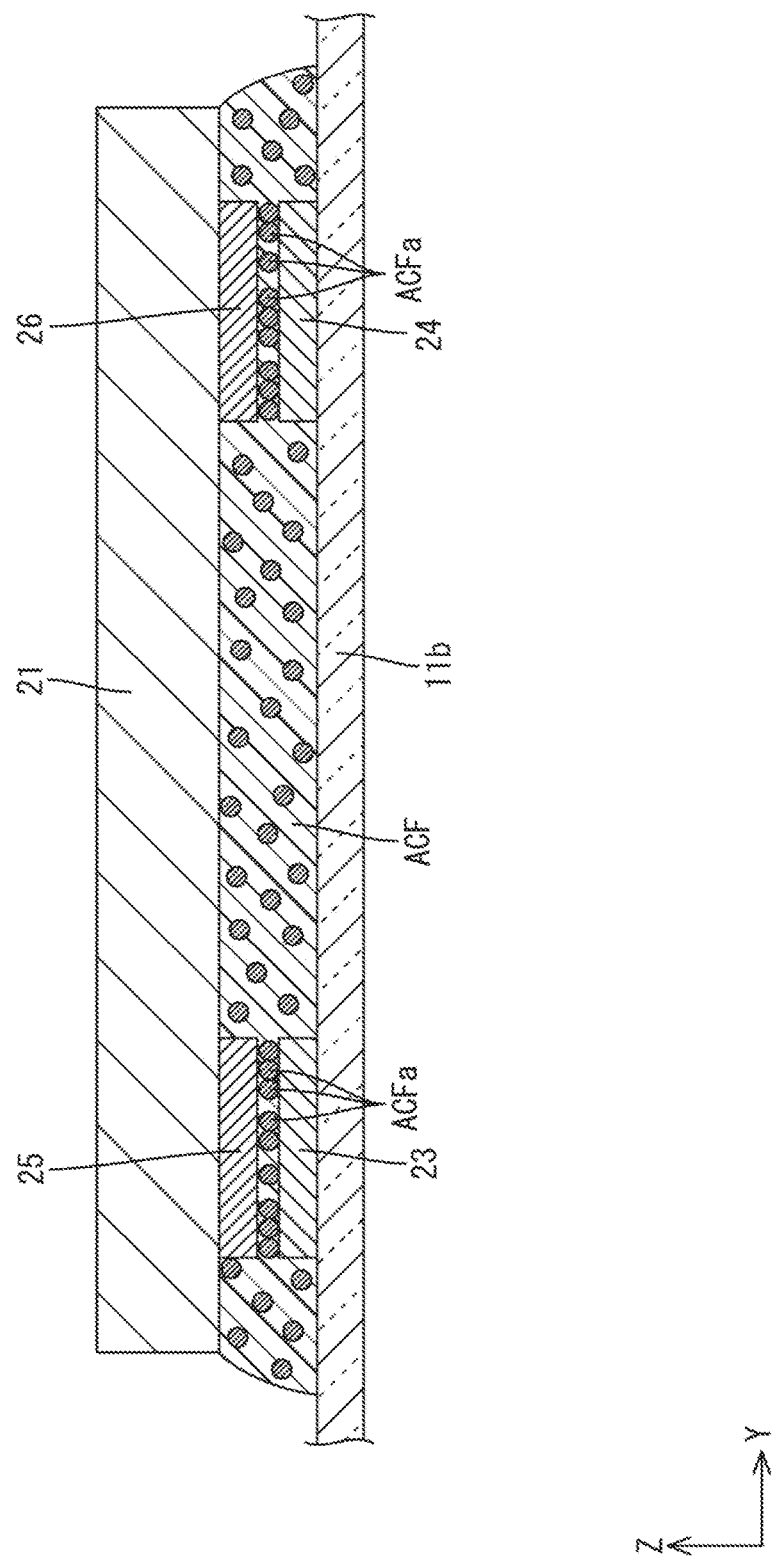
FIG. 5 is a cross sectional view of the driver and the array substrate taken along a Y-axis direction.

On the panel-side output terminal portions 23 and the panel-side input terminal portions 24, as illustrated in FIG. 5, an anisotropic conductive film (ACF) is applied. The anisotropic conductive film ACF includes electrically conductive particles ACFa. Via the electrically conductive particles ACFa, a driver-side input terminal portions 25 of the driver 21 is electrically connected to the panel-side output terminal portions 23, and a driver-side output terminal portions 26 is electrically connected to the panel-side input terminal portions 24. While not illustrated, the external connection terminal portions 22 also have a cross section structure including the first metal film and the transparent electrode film, similarly to the panel-side output terminal portions 23 and the panel-side input terminal portions 24, and are electrically connected to the terminal portion of the flexible substrate 13 via an anisotropic conductive film. The panel-side output terminal portions 23 and the panel-side input terminal portions 24, as illustrated in FIG. 4, are disposed at positions superimposed over the driver 21 in plan view in the non-display portion NAA of the array substrate 11b. That is, the panel-side output terminal portions 23 and the panel-side input terminal portions 24 are disposed in the mounting area for the driver 21. The panel-side output terminal portions 23 and the panel-side input terminal portions 24 are disposed side by side along the Y-axis direction (the direction in which the driver 21 and the display portion AA are arranged; the short-side direction of the driver 21) with a predetermined interval provided therebetween. The panel-side output terminal portions 23 are disposed on the flexible substrate 13 side (opposite side from the display portion AA side) in the mounting area for the driver 21 on the array substrate 11b. On the other hand, the panel-side input terminal portions 24 are disposed on the display portion AA side (opposite side from the flexible substrate 13 side). A number of panel-side output terminal portions 23 and a number of panel-side input terminal portions 24 are arranged side by side linearly along the X-axis direction, i.e., the long side direction of the driver 21 (direction orthogonal to the direction in which the driver 21 and the display portion AA are arranged), at respectively predetermined intervals.

The panel-side input terminal portions 24, as illustrated in FIG. 4, include a plurality of panel-side image input terminal portions 24A to which an image signal (data signal, video signal) included in the output signal output from the driver 21 is input, and a plurality of panel-side control input terminal portions 24B to which a control signal included in the output signal is input. Of a group of panel-side input terminal portions 24 with respect to the X-axis direction, a number of panel-side image input terminal portions 24A are disposed side by side intermittently along the X-axis direction from the right end position (one end position) to the left side in FIG. 4. The panel-side image input terminal portions 24A occupy a large part (majority) of the group of panel-side input terminal portions 24. On the other hand, of the group of panel-side input terminal portions 24 with respect to the X-axis direction, five panel-side control input terminal portions 24B are disposed side by side intermittently along the X-axis direction from the left end position (the other end position) to the right side in FIG. 4. The panel-side control input terminal portions 24B occupy a very small part (minority) of the group of panel-side input terminal portions 24. The panel-side image input terminal portions 24A and the panel-side control input terminal portions 24B are provided at approximately the same position with respect to the Y-axis direction, and are arranged side by side linearly along the X-axis direction.

The driver-side input terminal portions 25 and the driver-side output terminal portions 26, as illustrated in FIG. 5, are made of a metal material with high electrical conductivity, such as gold, and have the shape of bumps protruding from a bottom surface (surface opposing the array substrate 11b) of the driver 21. The driver-side input terminal portions 25 and the driver-side output terminal portions 26 are respectively connected to a processing circuit in the driver 21. An input signal input from the driver-side input terminal portions 25 is processed in the processing circuit, and a resultant signal is output to the driver-side output terminal portions 26. A number of driver-side input terminal portions 25 and a number of driver-side output terminal portions 26 are linearly arranged in parallel at predetermined intervals along the X-axis direction, i.e., the long side direction of the driver 21, similarly to the panel-side output terminal portions 23 and the panel-side input terminal portions 24.

In the non-display portion NAA of the array substrate 11b, at positions adjacent to the short-side portion and the long-side portion of the display portion AA, as illustrated in FIG. 4, the row circuit portion (row control circuit portion) 28 connected to the gate wires 19 of the display portion AA and the first column circuit portion (first column control circuit portion) 29 connected to the source wires 20 are respectively provided. A second column circuit portion (second column control circuit portion) 30 is provided so as to sandwich the first column circuit portion 29 with the display portion AA.

The row circuit portion 28, the first column circuit portion 29, and the second column circuit portion 30 are monolithically formed on the array substrate 11*b* using the same CG silicon thin film as that of the TFTs 17 as a base, and include a control circuit for controlling the supply of output signal to the TFTs 17. The row circuit portion 28, the first column circuit portion 29, and the second column circuit portion 30 are patterned on the array substrate 11*b* by known photolithography process simultaneously when gate electrodes, source electrodes, drain electrodes, semiconductor films and the like which constitute the gate wires 19, the source wires 20, various insulating films, and the TFTs 17 are patterned during the manufacturing process of the liquid crystal panel 11 (array substrate 11*b*). In addition, in the non-display portion NAA of the array substrate 11*b*, first column connection wires 36 connected to first column circuit portion 29 and the second column circuit portion 30, and second column connection wires 37 connected to the second column circuit portion 30 and the panel-side image input terminal portions 24A of the panel-side input terminal portions 24 are provided.

The row circuit portion 28, as illustrated in FIG. 4, is disposed at a position adjacent to the long-side portion on the left side of the display portion AA in FIG. 4, and is formed in a region with an elongated quadrangular shape extending along the Y-axis direction. The row circuit portion 28 has a long side dimension that is generally equal to the long side dimension of the display portion AA. The row circuit portion 28 is connected to the gate wires 19 provided in the display portion AA and to a plurality of row control wires 31 and a plurality of row power supply wires 32 provided in the non-display portion NAA. The row control wires 31 are provided to supply a signal (such as a clock signal) for controlling the driving of the row circuit portion 28. The row control wires 31 include first row control wires 31A with one end side connected to the row circuit portion 28, and second row control wires 31B with one end side connected to some of the panel-side control input terminal portions 24B and to some of the non-driver external connection terminal portions 22B. To the other end side of each of the first row control wires 31A and the second row control wires 31B, some of protection circuit portions 33 are connected. The protection circuit portions 33 are configured to protect the row circuit portion 28 from surge current when surge current is input to the panel-side control input terminal portions 24B or the non-driver external connection terminal portions 22B. The protection circuit portions 33 extend along the row direction (X-axis direction), and overlap with the second column circuit portion 30, which will be described later, in terms of column direction (Y-axis direction) arrangement. Specifically, the protection circuit portions 33 and the second column circuit portion 30 are disposed side by side along the row direction. The row power supply wires 32 are provided to supply power supply power to the row circuit portion 28. The row power supply wires 32 have one end side connected to the row circuit portion 28 and the other end side connected to some of the non-driver external connection terminal portions 22B. The row power supply wires 32 are routed around the more outer peripheral side than the protection circuit portions 33 and the row control wires 31 on the array substrate 11*b*.

The row circuit portion 28 includes a scan circuit for scanning the gate wires 19 successively by supplying a scan signal based on a signal supplied via the row control wires 31 to the gate wires 19 at predetermined timing. Specifically, a number of gate wires 19 are arranged side by side along the Y-axis direction in the display portion AA of the array substrate 11*b*. The row circuit portion 28, using the scan circuit, supplies the scan signal included in an output signal from the driver 21 to the gate wire 19 at the upper-end position and to the gate wire 19 at the lower-end position successively in the display portion AA illustrated in FIG. 4 (FIG. 1), thereby scanning the gate wires 19. Thus, the row circuit portion 28 is an indispensable configuration for displaying an image on the liquid crystal panel 11 during normal use, and constitutes a regular circuit (regular display circuit) together with the first column circuit portion 29, as will be described later. The row circuit portion 28 is equipped with accompanying circuit, such as a level shifter circuit and a buffer circuit.

The first column circuit portion 29, as illustrated in FIG. 4, is disposed at a position adjacent to the short-side portion on the lower side of the display portion AA, which is an area provided with a number of pixels PX, and is formed in an oblong quadrangular-shaped region extending along the row direction (X-axis direction). The first column circuit portion 29 has a long side dimension (row direction size) that is generally the same as the short-side dimension of the display portion AA. The first column circuit portion 29 is connected to the source wires 20 provided in the display portion AA, and is also connected to a plurality of first column control wires 34 and a plurality of first column connection wires 36 provided in the non-display portion NAA. The first column control wires 34 are provided to supply a signal (such as a sampling signal) for controlling the driving of the first column circuit portion 29. The first column control wires 34 include first circuit-side column control wires 34A with one end side connected to the first column circuit portion 29, and first terminal-side column control wires 34B with one end side connected to some of the panel-side control input terminal portions 24B (first column control signal input portion). To the other end side of each of the first circuit-side column control wires 34A and the first terminal-side column control wires 34B, some of protection circuit portions 33 (control wire protection circuit portion) are connected. The first column connection wires 36 are arranged closer to the row circuit portion 28 with respect to the row direction than the group of first circuit-side column control wires 34A. The details of the first column connection wires 36 will be described later.

The first column circuit portion 29, as illustrated in FIG. 4, includes a switch circuit (RGB switch circuit) for allocating an image signal included in the output signal supplied from the driver 21 to the source wires 20. Specifically, a number of source wires 20 are arranged side by side along the row direction in the display portion AA of the array substrate 11*b*, and are respectively connected to the TFTs 17 of the pixels PX of the colors of red, green, and blue. The first column circuit portion 29, using the switch circuit, allocates and supplies the image signal supplied from the driver 21 to the source wires 20 for red, green, and blue. The switch circuit included in the first column circuit portion 29 includes a number of unit switches 29*a* provided side by side linearly along the row direction. Three unit switches 29*a* connected to the source wires 20 for the pixels PX of the colors of red, green, and blue are associated with a single display unit for each color. Accordingly, the first column circuit portion 29 is an indispensable configuration for displaying an image on the liquid crystal panel 11 during normal use, and constitutes a regular circuit (regular display circuit) together with the row circuit portion 28. The plurality of unit switches 29*a* of the switch circuit have a row direction size which is approximately equal to the pitch (array interval) of the pixels PX (source wires 20) disposed side by side along the row direction. In addition, the unit switches 29a have an aligned positional relationship in the row direction with the respectively connected source wires 20. Accordingly, the end portion of each of the source wires 20 can be extended straight along the column direction and connected to the respective unit switches 29a, whereby the routing path of the source wires 20 can be simplified. In FIG. 4, the three unit switches 29a associated with each single display unit are enclosed by a solid line, where the individual unit switches 29a are demarcated and indicated by dashed lines.

The second column circuit portion 30, as illustrated in FIG. 4, is disposed so as to sandwich the first column circuit portion 29 with the display portion AA, which is the area where a number of pixels PX are provided, with respect to the column direction (Y-axis direction). In other words, the second column circuit portion 30 is disposed so as to be sandwiched between the first column circuit portion 29 and the driver 21 (panel-side image input terminal portions 24) with respect to the column direction. The second column circuit portion 30 is also arranged so as to be superimposed over the CF substrate 11a in plan view. The second column circuit portion 30 is provided over a predetermined region with respect to the row direction, where the region is narrower than the region over which the first column circuit portion 29 extends. The second column circuit portion 30 is arranged such that its central position with respect to the row direction is proximate to the central position of the first column circuit portion 29. Accordingly, the second column circuit portion 30 is provided with spaces on both sides thereof with respect to the row direction. Of these spaces, in the space on the row circuit portion 28 side of the second column circuit portion 30 with respect to the row direction, the plurality of protection circuit portions 33 are arranged. The second column circuit portion 30 is connected to the first column connection wires 36, the second column connection wires 37, and the second column control wires 35. The second column control wires 35 are provided to supply a signal for controlling the driving of the second column circuit portion 30. The second column control wires 35 include a second column control wire with one end side connected to the second column circuit portion 30 and the other end side connected to some of the non-driver external connection terminal portions 22B. The second column control wires 35 also include a second circuit-side column control wire 35A with one end side connected to the second column circuit portion 30, and a second terminal-side column control wire 35B with one end side connected to one of the non-driver external connection terminal portions 22B (second column control signal input portion). The other end side of each of the second circuit-side column control wire 35A and the second terminal-side column control wire 35B is connected to one of the protection circuit portions 33 (control wire protection circuit portion).

The second column circuit portion 30, as illustrated in FIG. 4, includes a plurality of unit circuits 30a arranged side by side. Each of the unit circuits 30a includes a test circuit configured to supply a test signal to the first column circuit portion 29, and a protection circuit for protecting the first column circuit portion 29 from surge current. The protection circuits in the unit circuits 30a are disposed closer to the second column connection wires 37 with respect to the column direction (closer to the panel-side input terminal portions 24). Accordingly, the protection circuits can prevent a surge current input from the panel-side input terminal portions 24 from reaching the test circuits in the unit circuits 30a or the first column circuit portion 29 via the second column connection wires 37. The test circuits in the unit circuits 30a are disposed closer to the first column connection wires 36 with respect to the column direction (closer to the first column circuit portion 29). The test circuits are circuits for displaying a simple test image in the display portion AA in a display test performed before the driver 21 is mounted during the manufacturing process of the liquid crystal panel 11. The test circuits are not used when an image is displayed during normal use of the liquid crystal panel 11 or the liquid crystal display device 10 as a final product. Thus, the second column circuit portion 30 cannot be considered an indispensable configuration for displaying an image on the liquid crystal panel 11 during normal use. Instead, the second column circuit portion 30 may be considered an irregular circuit (irregular display circuit). The second column circuit portion 30 includes a pair of diagonally arrayed circuit portions 38 in each of which the plurality of unit circuits 30a are arranged side by side along a diagonal direction intersecting the row direction and the column direction. The configuration of the diagonally arrayed circuit portions 38 will be described in detail later. The unit circuits 30a are displaced in the row direction with respect to the panel-side input terminal portions 24.

The first column connection wires 36, as illustrated in FIG. 4, are interposed between the second column circuit portion 30 and the first column circuit portion 29 in the column direction to provide a relay connection therebetween. The first column connection wires 36 are routed so as to expand outward in a generally fan shape in the row direction as the first column connection wires 36 extend from the second column circuit portion 30, which is relatively small-sized in the row direction, to the first column circuit portion 29, which is relatively large-sized in the row direction. The plurality of first column connection wires 36 routed in a generally fan shape are disposed line-symmetrically with respect to a center line passing the central position in the row direction of the first column circuit portion 29 and the second column circuit portion 30. Specifically, the first column connection wires 36 extend from the unit circuits 30a of the second column circuit portion 30 approximately straight along the column direction and are then bent to extend diagonally over a certain length along a direction inclined with respect to both the row direction and the column direction. The first column connection wires 36 are then again bent to extend approximately straight long the column direction, and are connected to the first column circuit portion 29. Thus, the first column connection wires 36 include first diagonally extending portions 36a which extend diagonally with respect to both the row direction and the column direction. The first diagonally extending portions 36a of the left-side half of the first column connection wires 36 illustrated in FIG. 4 are inclined in anticlockwise direction. On the other hand, the first diagonally extending portions 36a of the right-side half of the first column connection wires 36 illustrated in FIG. 4 are inclined in the opposite direction, i.e., in clockwise direction. The first diagonally extending portions 36a of the first column connection wires 36 provided on one side in the row direction with respect to the center line (left side or right side in FIG. 4) have an approximately constant inclination angle with respect to the row direction, where the first diagonally extending portions 36a that are adjacent to each other in the row direction are parallel with each other. The first diagonally extending portions 36a have varying length dimensions depending on their positions in the row direction. The length dimensions become smaller toward the center of the first column circuit portion 29 and the second column circuit portion 30 in the row direction. The length dimensions become greater toward the ends of the first column circuit portion 29 and the second column circuit portion 30 in the row direction. The first column connection wires 36 are made of the same second metal film as that of the source wires 20. Accordingly, the first column connection wires 36 are patterned on the array substrate 11b by known photolithography simultaneously when the source wires 20 and the like are patterned during the manufacturing process of the liquid crystal panel 11 (array substrate 11b).

The second column connection wires 37, as illustrated in FIG. 4, are interposed between the group of panel-side input terminal portions 24 and the second column circuit portion 30 in the column direction, and provide a relay connection therebetween. The second column connection wires 37 are routed so as to expand outward in a generally fan shape in the row direction as the second column connection wires 37 extend from the group of panel-side input terminal portions 24, which are relatively small-sized in the row direction, to the second column circuit portion 30, which is relatively large-sized in the row direction. The plurality of second column connection wires 37 routed in the generally fan shape are disposed line-symmetrically with respect to a center line passing the central position in the row direction of the first column circuit portion 29 and the second column circuit portion 30. Specifically, the second column connection wires 37 extend from the panel-side input terminal portions 24 approximately straight along the column direction and are then bent to extend diagonally over a certain length along a direction inclined with respect to both the row direction and the column direction. The second column connection wires 37 are then again bent to extend approximately straight along the column direction and connected to the unit circuits 30a of the second column circuit portion 30. Thus, the second column connection wires 37 include second diagonally extending portions (diagonally extending portion) 37a which extend diagonally (intersecting direction) with respect to both the row direction and the column direction. The second diagonally extending portions 37a of the left-side half of the second column connection wires 37 illustrated in FIG. 4 are inclined in anticlockwise direction. The second diagonally extending portions 37a of the right-side half of the second column connection wires 37 illustrated in FIG. 4 are inclined in the opposite direction, i.e., in clockwise direction. The second diagonally extending portions 37a of the second column connection wires 37 disposed on one side (left side or right side in FIG. 4) with respect to the center line in the row direction have an approximately constant inclination angle with respect to the row direction, where the second diagonally extending portions 37a that are adjacent to each other in the row direction are parallel with each other. The second diagonally extending portions 37a have varying length dimensions depending on their positions in the row direction. The length dimensions become smaller toward the center in the row direction of the group of panel-side input terminal portions 24 and the second column circuit portion 30. The length dimensions become greater toward the ends in the row direction of the group of panel-side input terminal portions 24 and the second column circuit portion 30. The second column connection wires 37 are made of the same first metal film as that of the gate wires 19. Accordingly, the second column connection wires 37 are patterned on the array substrate 11b by known photolithography simultaneously when the gate wires 19 and the like are patterned during the manufacturing process of the liquid crystal panel 11 (array substrate 11b).

The diagonally arrayed circuit portions 38 of the second column circuit portion 30 will be described in detail. The second column circuit portion 30, as illustrated in FIG. 4, includes a pair of diagonally arrayed circuit portions 38, and is generally line-symmetric with respect to a center line passing the central position in the row direction of the second column circuit portion 30. The diagonally arrayed circuit portions 38 include a plurality of unit circuits 30a which are arrayed such that the closer the unit circuits 30a on the side of the unit circuits 30a to be connected with the second diagonally extending portions 37a of the second column connection wires 37 become to the panel-side input terminal portions 24 in the row direction, the closer the unit circuits 30a become to the first column circuit portion 29 with respect to the column direction. Specifically, the closer the unit circuits 30a of the diagonally arrayed circuit portions 38 become to the center in the row direction of the second column circuit portion 30, the closer the unit circuits 30a become to the first column circuit portion 29 with respect to the column direction (away from the panel-side input terminal portions 24). The closer the unit circuits 30a become to the ends in the row direction of the second column circuit portion 30, the farther the unit circuits 30a become from the first column circuit portion 29 with respect to the column direction (closer to the panel-side input terminal portions 24). The plurality of unit circuits 30a of the diagonally arrayed circuit portions 38 are arranged such that the unit circuits 30a that are adjacent to each other are shifted by a certain dimension in the column direction. Preferably, the certain dimension maybe on the order of 1 μm when the size in the row direction of the unit circuits 30a is on the order of several tens of μm. The dimensional setting makes less likely the problem of a collapse in the layout of wire connections and the like for the plurality of unit circuits 30a of the diagonally arrayed circuit portions 38.

Figure 6:
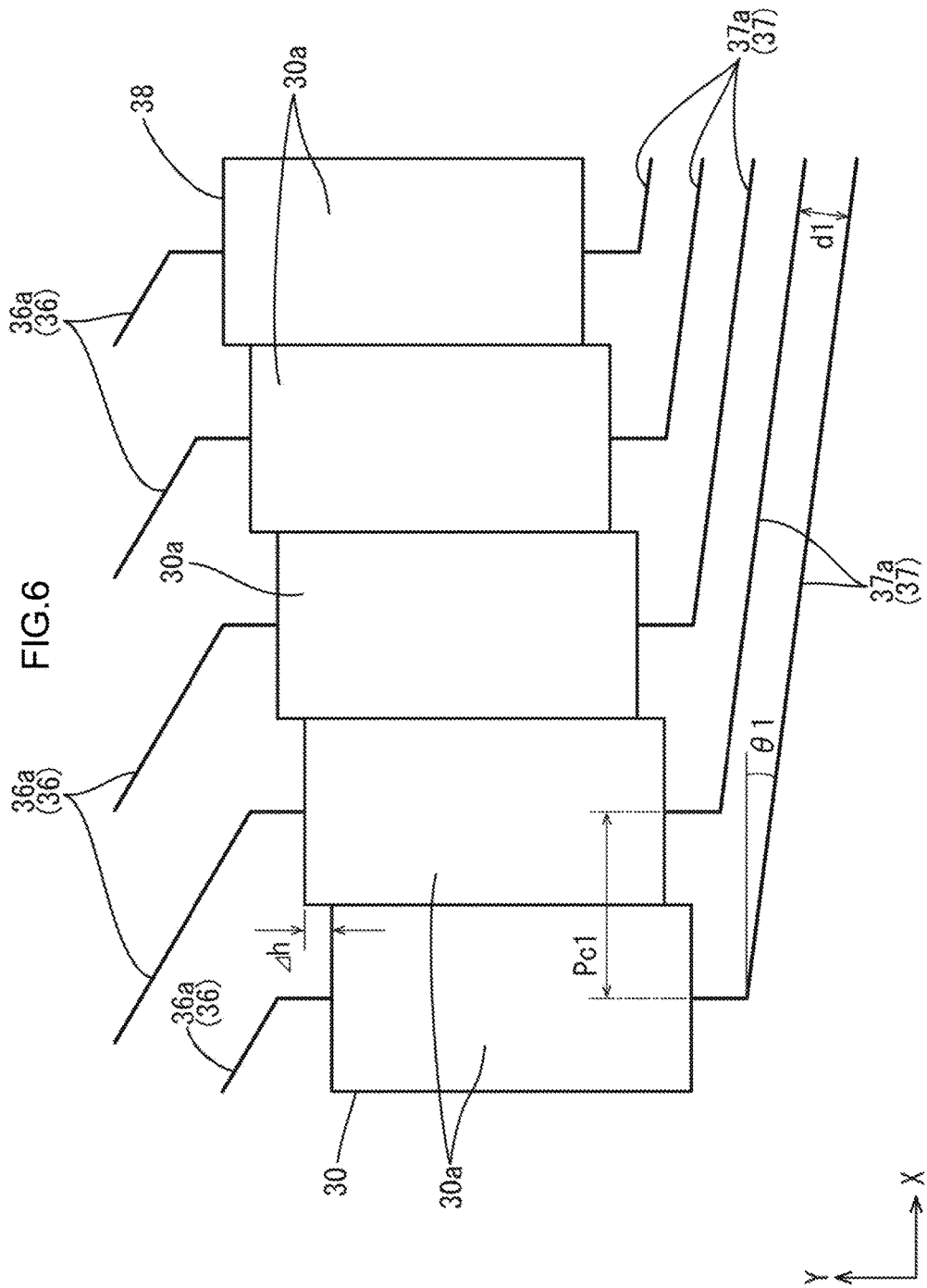
FIG. 6 is a plan view for describing an array of unit circuits and a second column connection wires which constitute a second column circuit portion.
Figure 7:
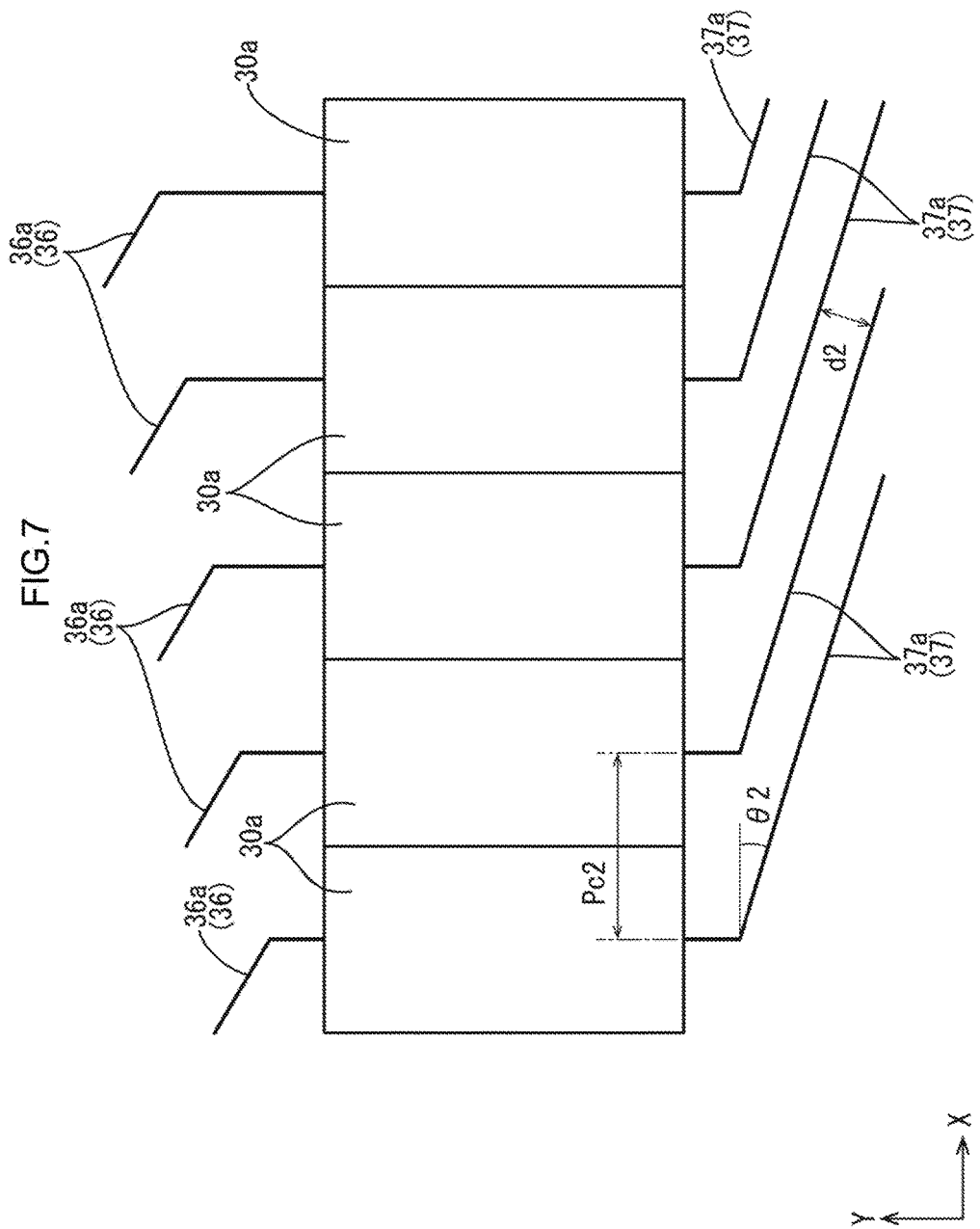
FIG. 7 is a plan view for describing an array of unit circuits and a second column connection wires in a case where the unit circuits constituting the second column circuit portion are disposed straight along the row direction.

In the diagonally arrayed circuit portions 38, the space between the second column circuit portion 30 and the group of panel-side input terminal portions 24 has an isosceles triangular shape in plan view, where the space becomes wider with respect to the column direction toward the center in the row direction, and becomes narrower with respect to the column direction toward the ends in the row direction. Accordingly, compared with the case where the plurality of unit circuits 30a are arrayed straight along the row direction, the angle formed by the second diagonally extending portions 37a of the second column connection wires 37, connecting the second column circuit portion 30 and the panel-side input terminal portions 24, with respect to the row direction can be decreased. Specifically, as illustrated in FIG. 6, for example, when the row direction size of the unit circuits 30a is Pc1, the amount of shift of the adjacent unit circuits 30a with respect to the column direction is Δh, the pitch between the adjacent second diagonally extending portions 37a is d1, and the inclination angle of the second diagonally extending portions 37a with respect to the row direction is θ1, θ1 is determined according to the expression, $\sin\theta_1 = d_1/(Pc_1 + \Delta h/\tan\theta_1)$. On the other hand, if the plurality of unit circuits 30a were arrayed straight along the row direction, as illustrated in FIG. 7, when the row direction size of the unit circuits 30a is Pc2, the pitch between the adjacent second diagonally extending portions 37a is d2, and the inclination angle of the second diagonally extending portions 37a with respect to the row direction is θ2, θ2 is determined according to the expression, $\sin\theta_2 = d_2/Pc_2$. In this case, under the condition where d1=d2 and Pc1=Pc2, the expression, $d_2/Pc_2 > d_1/(Pc_1 + \Delta h/\tan\theta_1)$ holds, so that, as a result, the expression, θ2>θ1 holds. Accordingly, the angle that the second diagonally extending portions 37a of the second column connection wires 37 forms with respect to the row direction becomes smaller. As a result, the arrangement space for the second column connection wires 37 with respect to the column direction becomes smaller, whereby a decrease in the frame size of the array substrate 11b can be achieved.

Figure 8:
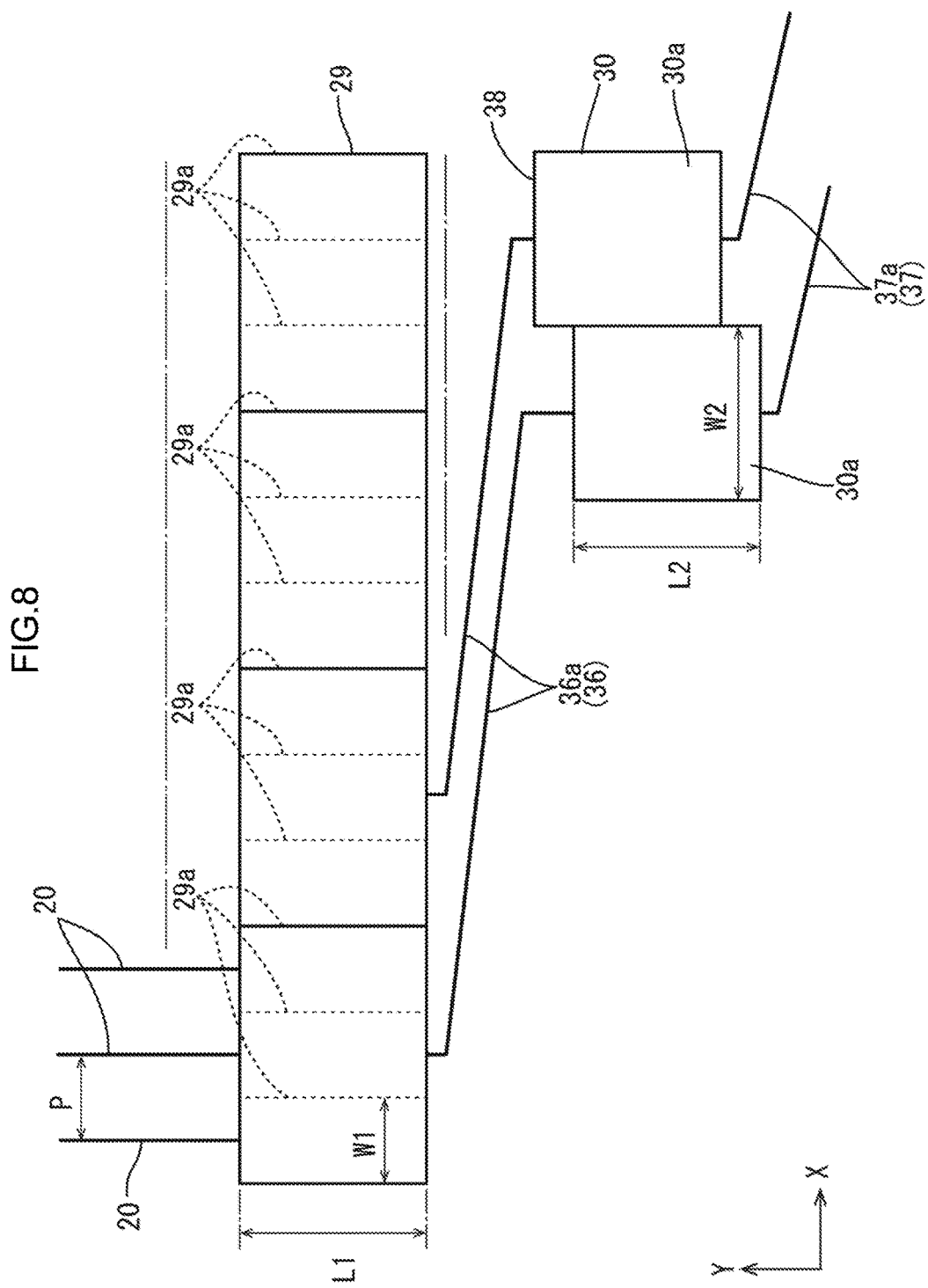
FIG. 8 is a plan view for describing the sizes in the row direction and the column direction of unit switches of a first column circuit portion and the unit circuits of the second column circuit portion.
Figure 9:
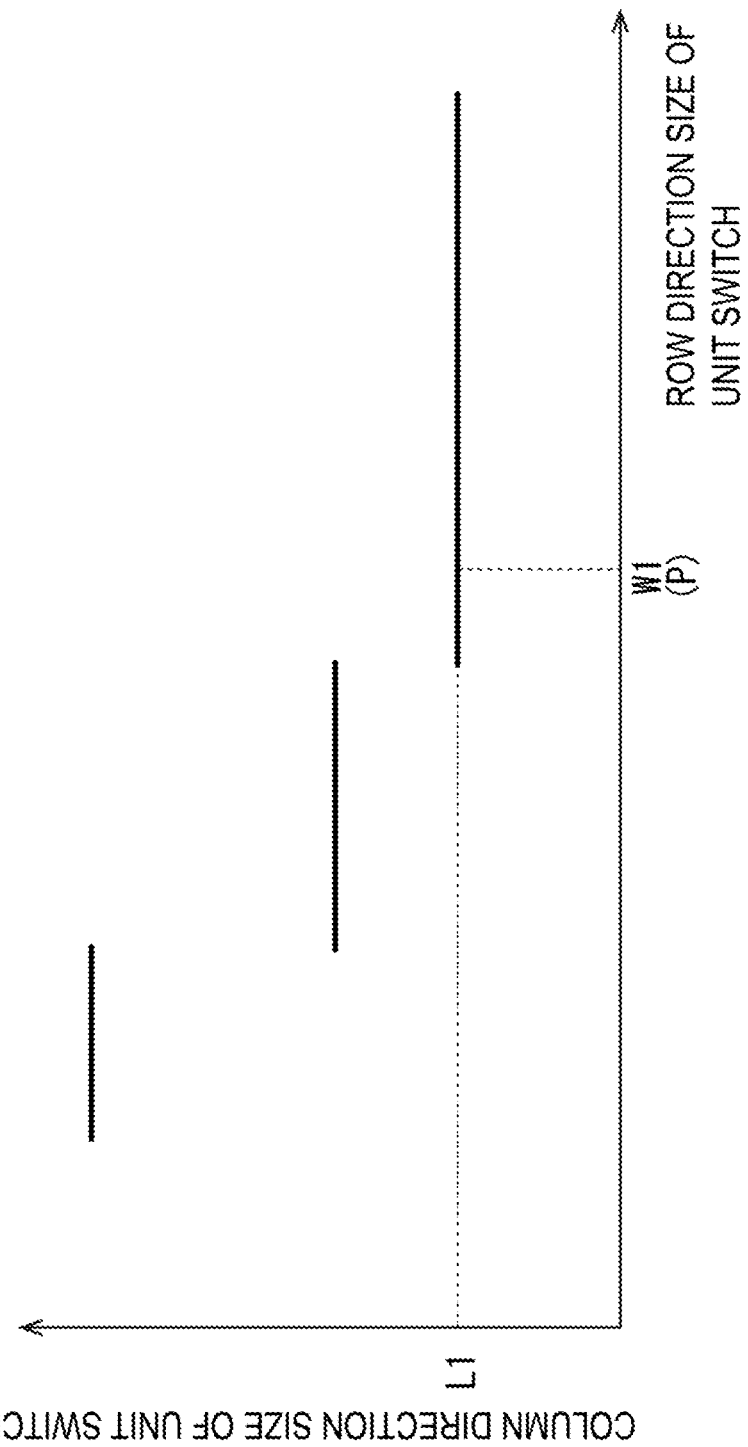
FIG. 9 is a graph illustrating the correlation between row direction size and column direction size in the unit switches of the first column circuit portion.
Figure 10:
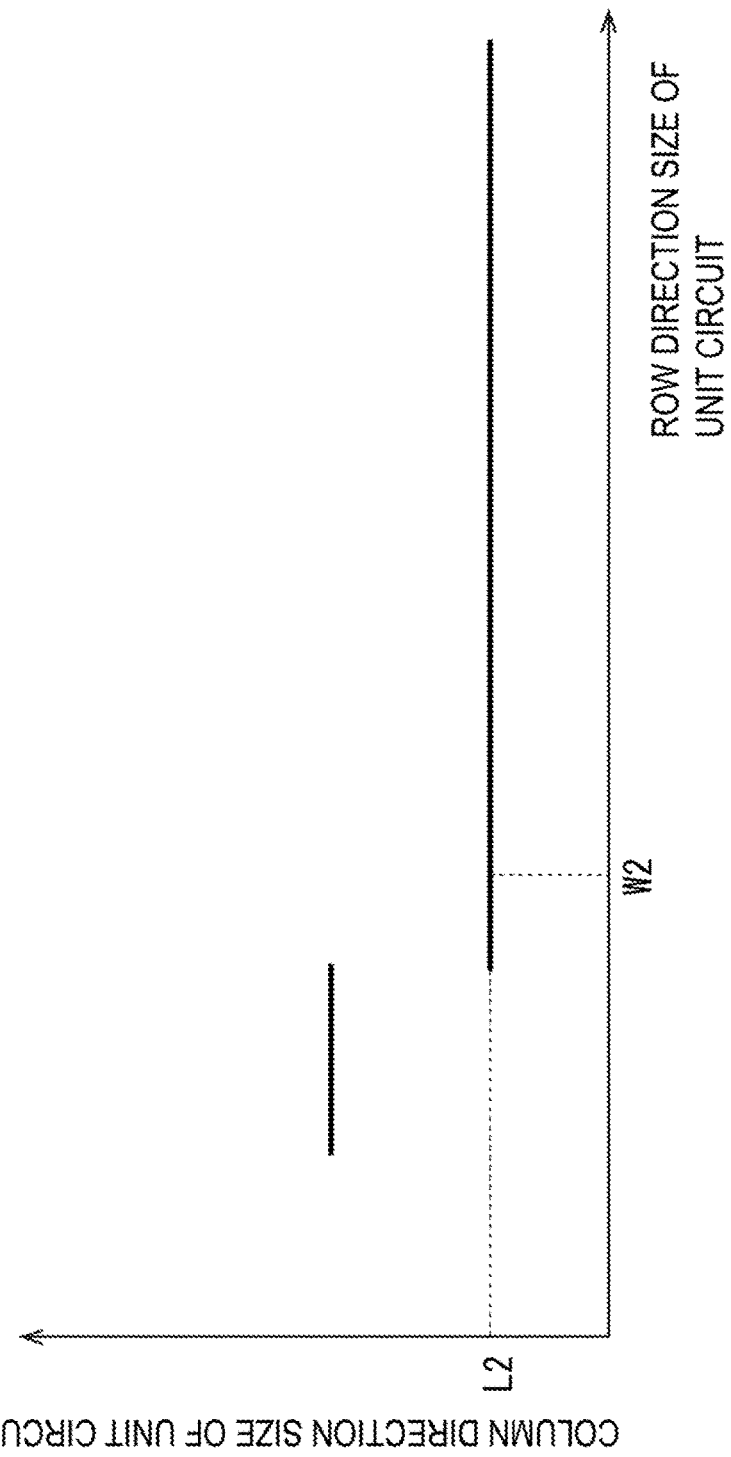
FIG. 10 is a graph illustrating the correlation between row direction size and column direction size in the unit circuits of the second column circuit portion.

The first column circuit portion 29 and the second column circuit portion 30 each have a correlation where the row direction size and the column direction size are discretely inversely proportional to each other. That is, the first column circuit portion 29 and the second column circuit portion 30 have the tendency such that, as the row direction size is increased, the column direction size can be decreased, and, conversely, as the row direction size is decreased, the column direction size needs to be increased, where the change is discrete (discontinuous). The correlation will be described more specifically. Referring to FIG. 8, the row direction size of the unit switches 29a of the first column circuit portion 29 is W1, and the column direction size of the unit switches 29a is L1. The row direction size of the unit circuits 30a of the second column circuit portion 30 is W2, and the column direction size of the unit circuits 30a is L2. The row direction size W1 of the unit switches 29a is approximately equal to the pitch P between the source wires 20 (pixels PX) disposed side by side in the row direction. The correlation between row direction size and column direction size of the unit switches 29a of the first column circuit portion 29 is illustrated in FIG. 9. The correlation between row direction size and column direction size of the unit circuits 30a of the second column circuit portion 30 is illustrated in FIG. 10. Referring to FIG. 9, the horizontal axis shows the row direction size of the unit switches 29a, and the vertical axis shows the column direction size of the unit switches 29a. Referring to FIG. 10, the horizontal axis shows the row direction size of the unit circuits 30a, and the vertical axis shows the column direction size of the unit circuits 30a.

As illustrated in FIG. 9 and FIG. 10, a discrete change in the column direction size of the unit switches 29a with respect to the row direction size of the unit switches 29a is relatively steeper than a discrete change in the column direction size of the unit circuits 30a with respect to the row direction size of the unit circuits 30a. A discrete change in the column direction size of the unit circuits 30a with respect to the row direction size of the unit circuits 30a is relatively gentler than a discrete change in the column direction size of the unit switches 29a with respect to the row direction size of the unit switches 29a. That is, when the row direction size of each of the unit switches 29a and the unit circuits 30a is decreased, the column direction size of the unit switches 29a tends to exhibit a discretely greater value than the column direction size of the unit circuits 30a. The switch circuit included in the first column circuit portion 29 is a type of the above-described regular circuit. If the circuit layout of the elements and the like (such as TFTs) of the unit switches 29a becomes inappropriate, the switching function of the switch circuit may be adversely affected, and a display defect may be caused. Accordingly, as illustrated in FIG. 9, when the row direction size of the unit switches 29a is decreased, a sufficient column direction size needs to be secured in order to maintain an appropriate circuit layout. Conversely, when the column direction size of the unit switches 29a is decreased, a sufficient row direction size needs to be secured in order to maintain an appropriate circuit layout. That is, the switch circuit included in the first column circuit portion 29 has a strict design rule for the circuit layout in order to ensure its function, and has low freedom of design. Thus, the unit switches 29a have a steep correlation with regard to the discrete change of the column direction size relative to the row direction size. On the other hand, the test circuits and the protection circuits in the second column circuit portion 30 are types of the above-described irregular circuit, and are provided to ensure that a display defect is not caused by the circuit layout of the elements and the like of the unit circuits 30a. Accordingly, the unit circuits 30a of the test circuits and protection circuits have higher design freedom of circuit layout than the unit switches 29a of the switch circuit. Thus, the unit circuits 30a have a gentle correlation with respect to the discrete change in the column direction size relative to the row direction size.

Thus, the second column circuit portion 30 has a relatively gentle discrete change concerning row direction size and column direction size. Accordingly, even when the row direction size is decreased, the column direction size is hardly increased. This makes it possible to effectively utilize the space on the outside in the row direction with respect to the second column circuit portion 30 on the array substrate 11b, such as to arrange the protection circuit portions 33 in the space. In addition, the arrangement space for the second column circuit portion 30 with respect to the column direction can be decreased, which is preferable for achieving a decrease in frame size of the array substrate 11b. On the other hand, while the first column circuit portion 29 has a relatively steep discrete chance concerning the row direction size and column direction size, various wires and circuit for the protection circuit portions 33 and the like do not need to be installed on the outside in the row direction with respect to the first column circuit portion 29. Accordingly, the row direction size of the first column circuit portion 29 can be can be made sufficiently large, and the arrangement space with respect to the column direction can be maintained to be small, which is more preferable in achieving a decrease in frame size of the array substrate 11b.

Figure 11:
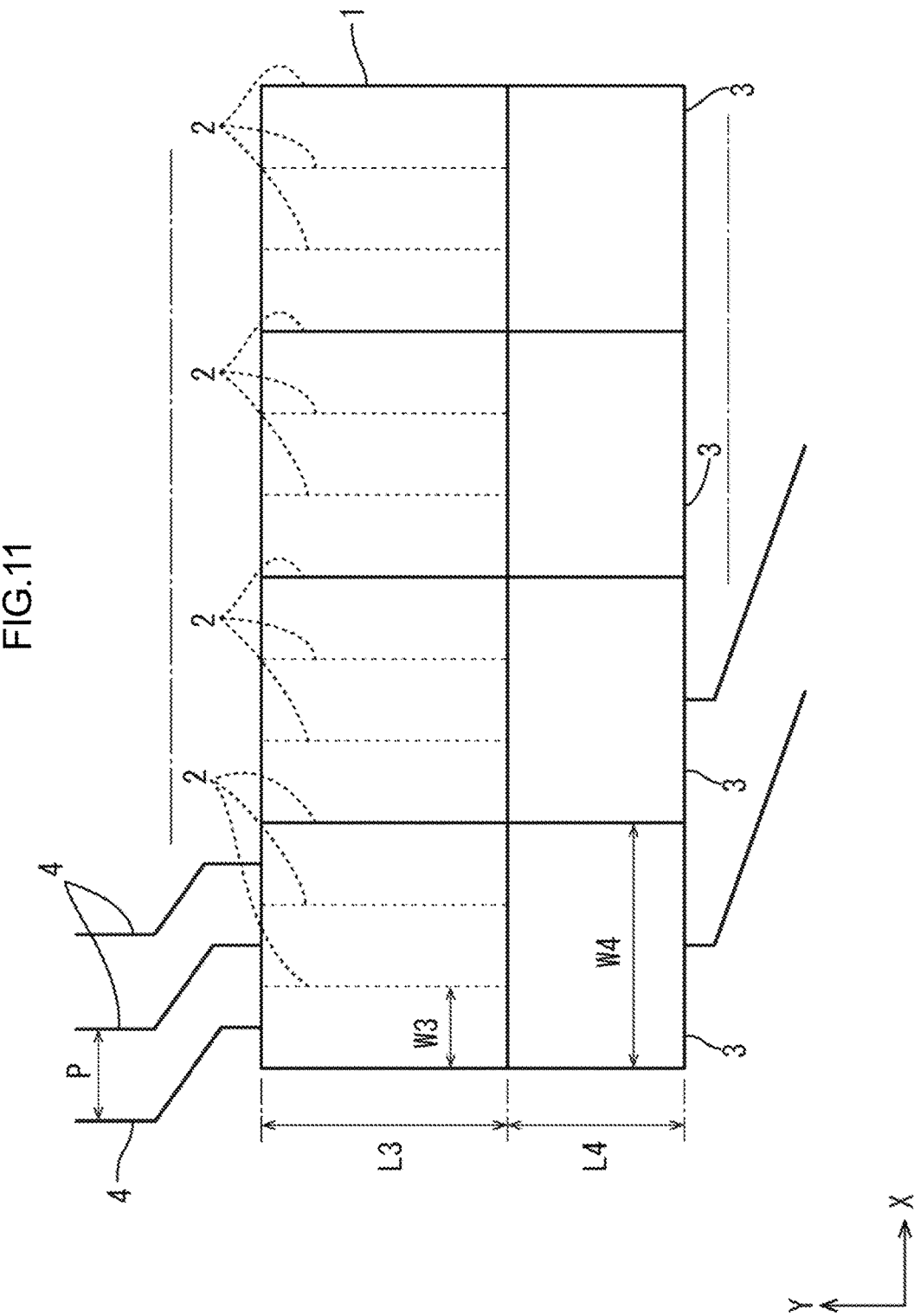
FIG. 11 is a plan view for describing the sizes in the row direction and column direction of the unit switches and unit circuits of a column circuit portion according to a comparative example in the first embodiment.
Figure 12:
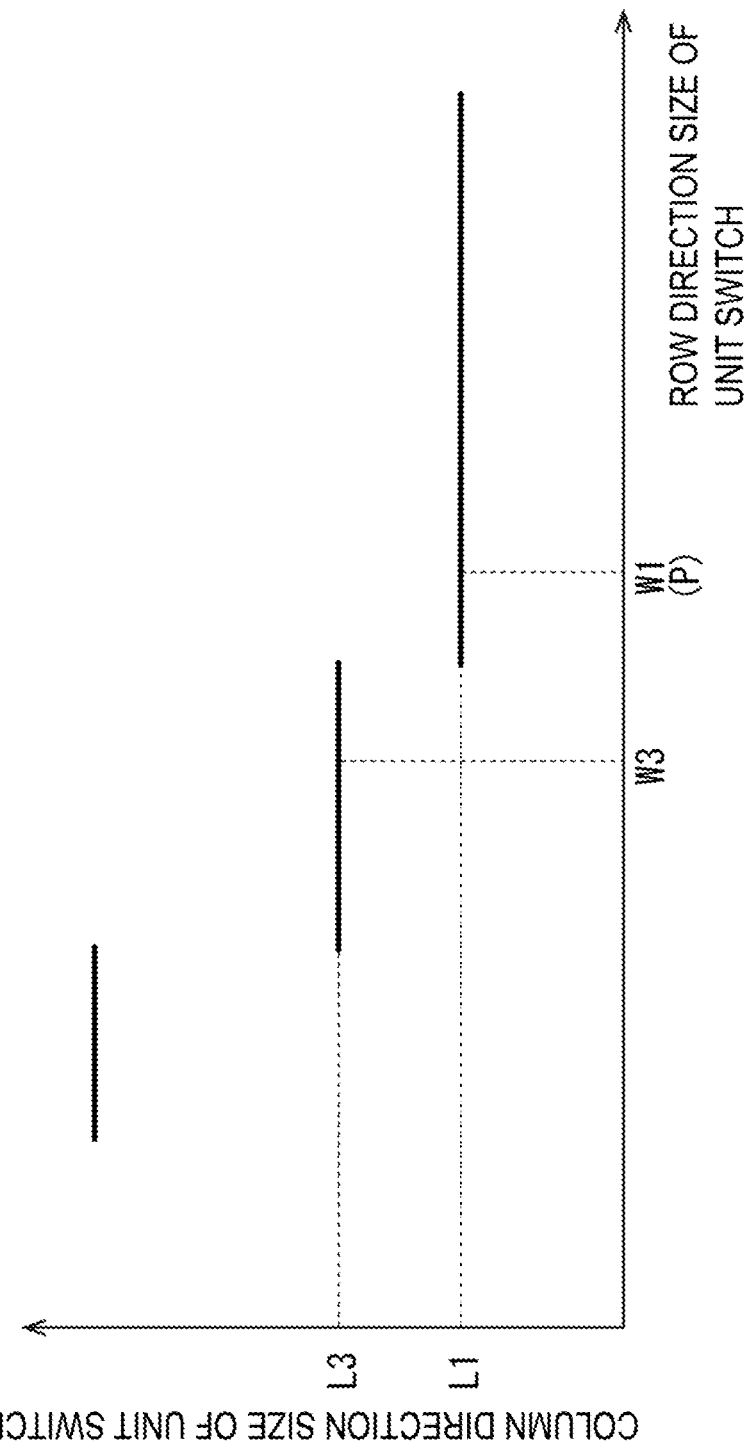
FIG. 12 is a graph illustrating the correlation between row direction size and column direction size in the unit switches of the column circuit portion according to the comparative example of the first embodiment.
Figure 13:
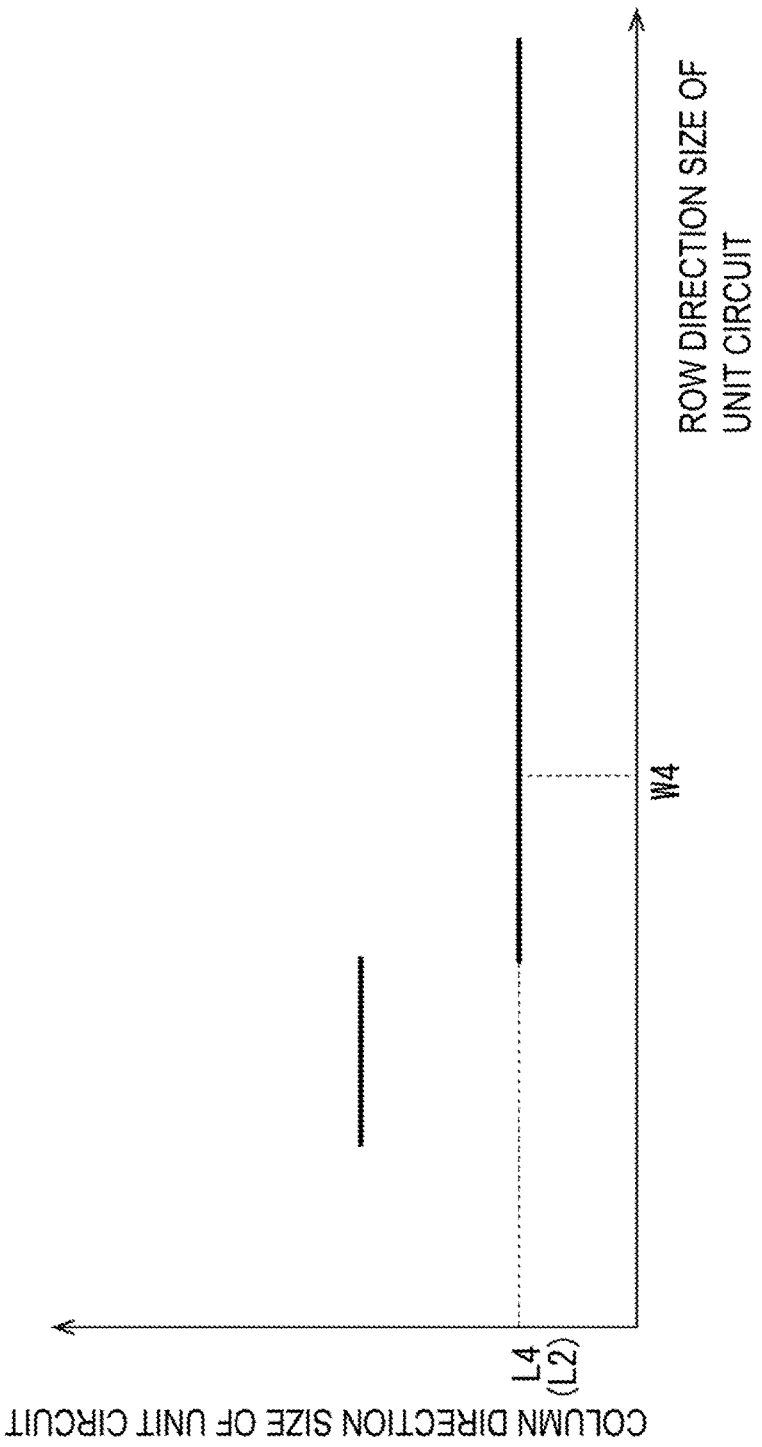
FIG. 13 is a graph illustrating the correlation between row direction size and column direction size in the unit circuits of the column circuit portion according to the comparative example of the first embodiment.

A comparative example to the present embodiment will be considered. The comparative example, as illustrated in FIG. 11, has a configuration in which a column circuit portion 1 includes a switch circuit, a test circuit, and a protection circuit integrally. In the column circuit portion 1, unit switches 2 constituting the switch circuit, and unit circuits 3 constituting the test circuit and the protection circuit are arranged side by side in the column direction. In the column circuit portion 1, the row direction size of the unit switches 2 is W3, and the column direction size of the unit switches 2 is L3. In the column circuit portion 1, the row direction size of the unit circuits 3 is W4, and the column direction size of the unit circuits 3 is L4. The correlation between row direction size and column direction size of the unit switches 2 of the column circuit portion 1 is illustrated in FIG. 11. The correlation between row direction size and column direction size of the unit circuits 3 of the column circuit portion 1 is illustrated in FIG. 13. Referring to FIG. 12, the horizontal axis shows the row direction size of the unit switches 2, and the vertical axis shows the column direction size of the unit switches 2. Referring to FIG. 13, the horizontal axis shows the row direction size of the unit circuits 3, and the vertical axis shows the column direction size of the unit circuits 3.

The row direction size W3 of the unit switches 2, as illustrated in FIG. 11, is smaller than the pitch P between the source wires 4 (pixels PX) disposed side by side in the row direction. The row direction size W3 of the unit switches 2 has such dimension for the following reason. The column circuit portion 1 has the configuration integrally including the switch circuit, the test circuit, and the protection circuit.

Accordingly, various wires and circuit for the protection circuit portions 33 and the like, not illustrated, need to be arranged adjacent to each other in the row direction with respect to the column circuit portion 1, thus restricting the size of the column circuit portion 1 as a whole in the row direction. The row direction size of the column circuit portion 1 as a whole is smaller than the row direction size of the first column circuit portion 29 according to the present embodiment as a whole. Because the row direction size W3 of the unit switches 2 is smaller than the pitch P between the row direction source wires 4 disposed side by side, the row direction size W3 is smaller than the row direction size W1 of the unit switches 29a (the same dimension as the pitch P) of the first column circuit portion 29 according to the present embodiment. Accordingly, the column direction size L3 of the unit switches 2, as illustrated in FIG. 12, is greater than the column direction size L1 of the unit switches 29a of the first column circuit portion 29 according to the present embodiment. Thus, even when the row direction size W4 of the unit circuits 3 is equal to or smaller than the row direction size W2 of the unit circuits 30a of the second column circuit portion 30 according to the present embodiment, and the column direction sizes L2, L4 are equal, the column direction size of the column circuit portion 1 as a whole (L3+L4) becomes greater than a total value of the column direction size L1 of the first column circuit portion 29 and the column direction size L2 of the second column circuit portion 30. That is, the first column circuit portion 1 has an arrangement space on the array substrate 11b that is relatively larger than that of the first column circuit portion 29 and the second column circuit portion 30 according to the present embodiment, resulting in a wider frame of the array substrate 11b. In this respect, in the first column circuit portion 29 according to the present embodiment, the column direction size L1 of the unit switches 29a is smaller than the column direction size L3 of the unit switches 2 of the column circuit portion 1 according to the comparative example. Thus, the arrangement space for the first column circuit portion 29 and the second column circuit portion 30 on the array substrate 11b is decreased by the difference, whereby a decrease in frame size of the array substrate 11b is achieved. The row direction size W4 of the unit circuits 3 is approximately three times the row direction size W3 of the unit switches 29a.

As described above, the array substrate (active matrix substrate) 11b of the present embodiment is provided with: a plurality of pixels PX arrayed in a matrix along the row direction and the column direction; a plurality of source wires (column wires) 20 which are disposed side by side along the column direction and which are connected to the plurality of pixels PX; the first column circuit portion 29 extending along the row direction and connected to the plurality of source wires 20; a plurality of first column connection wires 36 connected to the first column circuit portion 29; the second column circuit portion 30 which is disposed so as to sandwich the first column circuit portion 29 with the plurality of pixels PX, and which includes a plurality of unit circuits 30a respectively connected to the plurality of first column connection wires 36; the panel-side input terminal portion (signal input portion) 24 which is disposed so as to sandwich the second column circuit portion 30 with the first column circuit portion 29 to input a signal to the second column circuit portion 30, the plurality of panel-side input terminal portions 24 including a panel-side input terminal portion 24 which is displaced in the row direction with respect to the unit circuits 30a to be connected; a plurality of second column connection wires 37 which are respectively connected to the plurality of unit circuits 30a of the second column circuit portion 30 and to the plurality of panel-side input terminal portions 24, and which include at least the second diagonally extending portions (diagonally extending portion) 37a extending from the unit circuits 30a along a direction intersecting the row direction and the column direction toward the panel-side input terminal portions 24 to be connected; and the diagonally arrayed circuit portions 38 in which at least some of the plurality of unit circuits 30a of the second column circuit portion 30 are arranged side by side along a direction intersecting the row direction and the column direction, the plurality of unit circuits 30a of the diagonally arrayed circuit portions 38 being arrayed such that the closer the unit circuits 30a on the side of the unit circuits 30a to be connected with the second diagonally extending portions 37a become to the input terminal portion in the row direction, the closer the unit circuits 30a become to the first column circuit portion 29 with respect to the column direction.

When a signal from the panel-side input terminal portions 24 is input to the second column circuit portion 30 via the second column connection wires 37, the signal is input to the first column circuit portion 29 via the first column connection wires 36 and is then supplied to the plurality of pixels PX via the source wires 20. At least some of the plurality of unit pixels PX of the second column circuit portion 30 are disposed side by side along a direction intersecting the row direction and the column direction, whereby the diagonally arrayed circuit portions 38 are configured. The diagonally arrayed circuit portions 38 include a plurality of unit circuits 30a arrayed such that the closer the unit circuits 30a on the side of the unit circuits 30a to be connected with the second diagonally extending portions 37a become to the input terminal portion in the row direction, the closer the unit circuits 30a become to the first column circuit portion 29 with respect to the column direction. Thus, compared with the case where the plurality of unit circuits 30a are arrayed straight along the row direction, the angle formed by the second diagonally extending portions 37a of the second column connection wires 37, connecting the second column circuit portion 30 and the panel-side input terminal portions 24, with respect to the row direction can be made decreased. In this way, the arrangement space for the second column connection wires 37 with respect to the column direction is decreased, whereby a decrease in frame size of the array substrate 11b can be achieved.

In addition, because the second column circuit portion 30 is separated from the first column circuit portion 29, the first column circuit portion 29 can be prevented from restricting the row direction size of the second column circuit portion 30. Accordingly, the row direction size of the second column circuit portion 30 can be easily decreased. A decrease in the row direction size of the second column circuit portion 30 makes it possible to effectively utilize the space on the outside in the row direction with respect to the second column circuit portion 30 on the array substrate 11b. For example, it becomes possible to install various wires and circuit and the like, which tend to increase as a result of an increase in resolution or size, in the space, which is preferable from the viewpoint of achieving an increase in resolution and size. When the various wires and circuit are installed in the space on the outside in the row direction with respect to the second column circuit portion 30 on the array substrate 11b, there is no need to install the various wires and circuit on the outside in the row direction with respect to the first column circuit portion 29. As a result, it becomes possible to decrease the row direction size of the first column circuit portion 29 to thereby decrease the column direction size, whereby the arrangement space for the first column circuit portion 29 with respect to the column direction is decreased. Accordingly, a further decrease in frame size of the array substrate 11b can be achieved.

The first column circuit portion 29 and the second column circuit portion 30 each have a correlation such that the row direction size and the column direction size are discretely inversely proportional to each other. The second column circuit portion 30 has a relatively gentler discrete change than the first column circuit portion 29 concerning the row direction size and the column direction size. Because the second column circuit portion 30 has a relatively gentler discrete change concerning the row direction size and the column direction size, a decrease in the row direction size does not readily lead to an increase in the column direction size. That "the discrete change is gentle" may be understood to mean that, when the layout of a circuit of interest is viewed in plan: 1) the space between adjacent wires is wide; 2) the space between wires and transistors is wide; and 3) wires themselves are thick and therefore can be made thinner. Accordingly, the space on the outside in the row direction with respect to the second column circuit portion 30 on the array substrate 11b can be effectively utilized. In addition, the arrangement space for the second column circuit portion 30 with respect to the column direction can be decreased, which is preferable for achieving a decrease in frame size of the array substrate 11b. On the other hand, while the first column circuit portion 29 has a relatively steep discrete change concerning the row direction size and the column direction size, there is no need to install various wires and circuit on the outside in the row direction with respect to the first column circuit portion 29. Thus, the row direction size of the first column circuit portion 29 can be made sufficiently large, whereby the arrangement space with respect to the column direction can be maintained to be small. In this way, a decrease in frame size of the array substrate 11b can be achieved in a more preferable manner.

The first column circuit portion 29 includes switch circuits for allocating a signal to the plurality of source wires 20 respectively connected to the plurality of pixels PX disposed side by side along the row direction. The switch circuits tend to have a steep discrete change concerning the row direction size and the column direction size. However, there is no need to install various wires and circuit on the outside in the row direction with respect to the first column circuit portion 29 including the switch circuits. Accordingly, the row direction size of the first column circuit portion 29 can be made sufficiently large, whereby the arrangement space with respect to the column direction can be maintained to be small. In this way, a decrease in frame size of the array substrate 11b can be achieved in a preferable manner.

The switch circuits include a plurality of unit switches 29a disposed side by side linearly along the row direction. The unit switches 29a have a row direction size equal to the pitch between the plurality of pixels PX disposed side by side along the row direction. In this way, the row direction size of the unit switches 29a is sufficiently increased, the function of the unit switches 29a can be performed with high reliability, which is more preferable for achieving an increase in resolution. In addition, the row direction size of the unit switches 29a is equal to the pitch between the plurality of pixels PX disposed side by side along the row direction. Accordingly, by aligning the positional relationship between the unit switches 29a and the source wires 20 in the row direction, for example, the routing path of the source wires 20 connected to the pixels PX and the unit switches 29a can be simplified.

The second column circuit portion 30 includes at least one of a test circuit configured to supply a test signal to the first column circuit portion 29 and a protection circuit for protecting the first column circuit portion 29 from surge current. The test circuit and the protection circuit both tend to have a gentle discrete change concerning the row direction size and the column direction size. Accordingly, a decrease in the row direction size does not readily lead to an increase in the column direction size. Thus, the space on the outside in the row direction with respect to the second column circuit portion 30 on the array substrate 11b can be effectively utilized. In addition, the arrangement space for the second column circuit portion 30 with respect to the column direction can be decreased, which is preferable for achieving a decrease in frame size of the array substrate 11b.

The second column circuit portion 30 includes both a test circuit and a protection circuit. Because the second column circuit portion 30 includes both the test circuit and the protection circuit and is thereby provided with multi-functionality, there is no need to provide a test circuit or a protection circuit other than the second column circuit portion 30, which is preferable for achieving a decrease in frame size of the array substrate 11b. Further, decreasing the row direction size of the second column circuit portion 30 including both the test circuit and the protection circuit does not readily lead to an increase in the column direction size.

The array substrate 11b is also provided with: the first column control wires 34 which are connected to the first column circuit portion 29 and to which a first column control signal is transmitted; the panel-side control input terminal portions (first column control signal input portion) 24B which are connected to the first column control wires 34 and to which the first column control signal is input; the second column control wires 35 which are connected to the second column circuit portion 30 and to which the second column control signal is transmitted; the non-driver external connection terminal portions (second column control signal input portion) 22B which are connected to the second column control wires 35 and to which the second column control signal is input; and the protection circuit portion (control wire protection circuit portion) 33 which is provided along the routing of the first column control wires 34 and the second column control wires 35 to protect the first column circuit portion 29 and the second column circuit portion 30 from surge current, the protection circuit portions 33 being disposed side by side along the row direction with respect to the second column circuit portion 30. In this way, even when a surge current is input to the panel-side control input terminal portions 24B or the non-driver external connection terminal portions 22B, the first column circuit portion 29 and the second column circuit portion 30 can be protected from the surge current by the protection circuit portions 33 provided along the routing of the first column control wires 34 and the second column control wires 35. The protection circuit portions 33 are disposed side by side along the row direction with respect to the second column circuit portion 30, and are not arranged side by side along the row direction with respect to the first column circuit portion 29. Accordingly, the row direction size of the first column circuit portion 29 can be made sufficiently large, whereby the column direction size of the first column circuit portion 29 can be maintained to be small. In this way, a decrease in frame size of the array substrate 11b can be achieved in a preferable manner.

The liquid crystal panel (display panel) 11 according to the present embodiment is provided with the array substrate 11b, and the CF substrate (counter substrate) 11a bonded to the array substrate 11b. In the liquid crystal panel 11 having the above-described configuration, a decrease in frame size of the array substrate 11b and an increase in resolution and the like are achieved. Accordingly, the display quality of the image displayed on the display panel can be increased, and sophisticated design can be obtained.

<Second embodiment>

A second embodiment of the present invention will be described with reference to FIG. 14 or FIG. 15. In the second embodiment, a modification of the configuration of a second column circuit portion 130 and the like will be described. Redundant descriptions of structures, operations, and effects similar to those of the first embodiment will be omitted.

Figure 14:
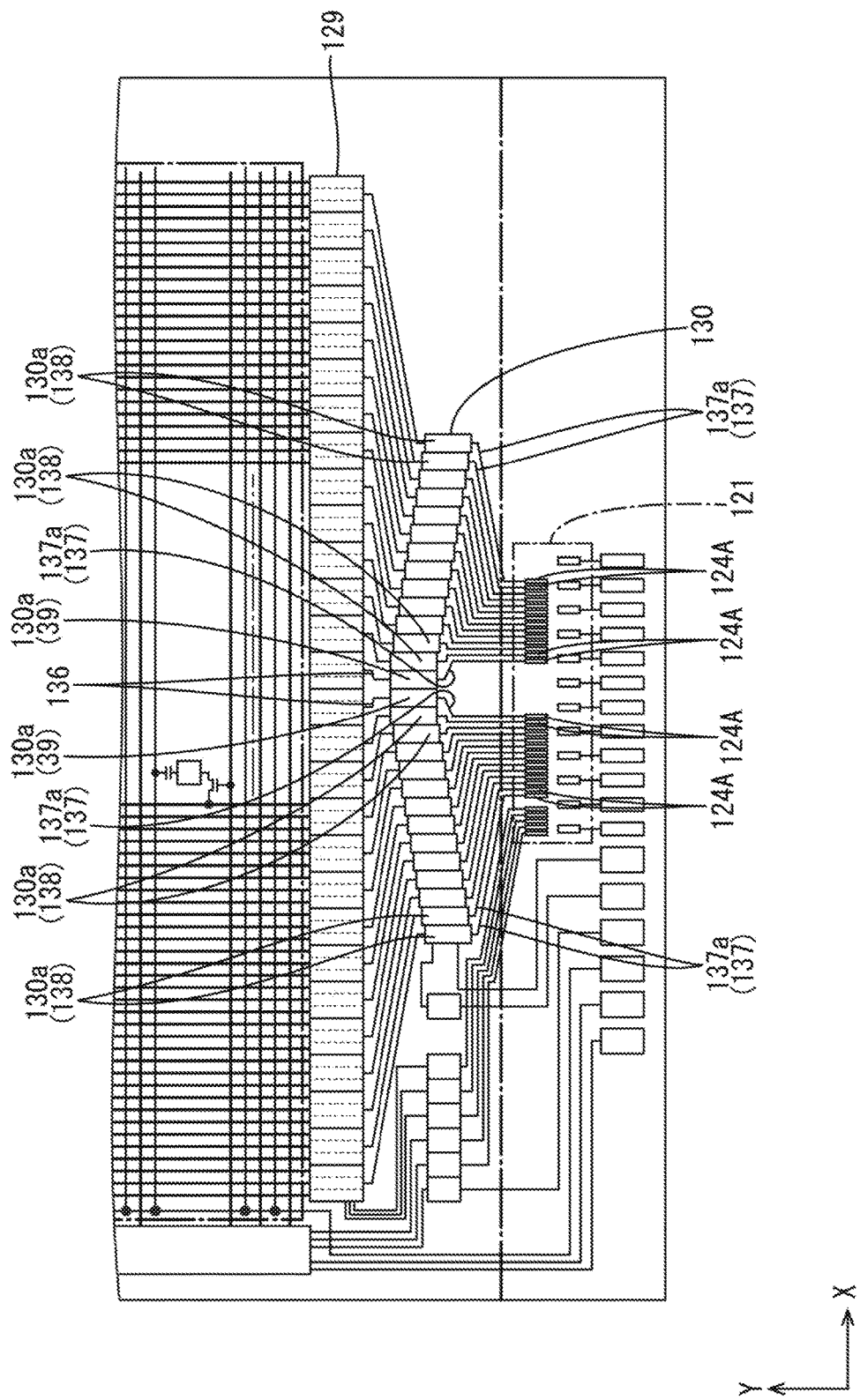
FIG. 14 is a plan view illustrating a configuration of wires and the like in a portion of an array substrate according to the second embodiment of the present invention in which a driver and a flexible substrate are mounted.
Figure 15:
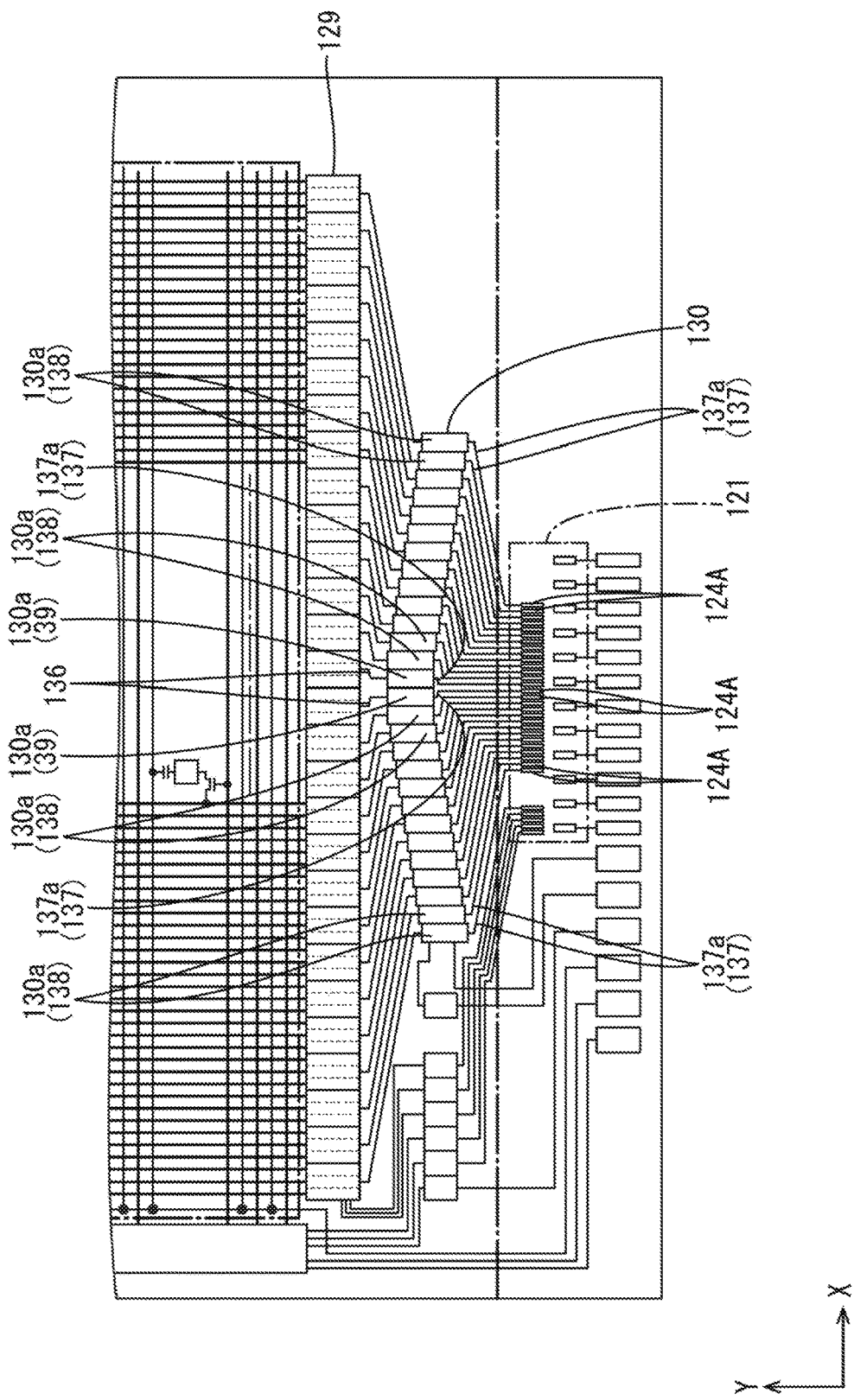
FIG. 15 is a plan view of a modified wiring layout.

The second column circuit portion 130 according to the present embodiment, as illustrated in FIG. 14, includes a pair of diagonally arrayed circuit portions 138, and a straight array circuit portion 39 in which unit circuits 130a are arranged linearly side by side along the row direction. The straight array circuit portion 39 is disposed at the central position in the row direction of second column circuit portion 130, and is interposed between the pair of diagonally arrayed circuit portions 138 in the row direction. Specifically, the unit circuits 130a of the straight array circuit portion 39 are provided adjacent in the row direction to, and aligned in the column direction with, those of the unit circuits 130a of the pair of diagonally arrayed circuit portions 138 that are the closest to a first column control portion 129 with respect to the column direction. Due to the presence of the straight array circuit portion 39 thus configured, an interval corresponding to the straight array circuit portion 39 with respect to the row direction is provided between the pair of diagonally arrayed circuit portions 138. Accordingly, the layout freedom of the second column connection wires 137 connected to the plurality of unit circuits 130a of the second column circuit portion 130 is increased, and the arrangement freedom of a panel-side image input terminal portions 124A connected to the second column connection wires 137 is increased.

Specifically, to the unit circuits 130a of the straight array circuit portion 39, as illustrated in FIG. 14, the end portions of first column connection wires 136 and second column connection wires 137 are respectively connected. To the end portions of the second column connection wires 137 on the opposite side from the unit circuits 130a, the panel-side image input terminal portions 124A are connected. The second column connection wires 137 connected to the unit circuits 130a of the straight array circuit portion 39 are disposed line-symmetrically with respect to a center line passing the central position in the row direction of the second column circuit portion 130. More specifically, the second column connection wires 137 connected to the unit circuits 130a of the straight array circuit portion 39 include second diagonally extending portions 137a which are provided on the left side and the right side with respect to the center line in FIG. 14, where the second diagonally extending portions 137a are inclined such that the closer the second diagonally extending portions 137a become to the panel-side image input terminal portions 124A, the farther the second diagonally extending portions 137a become from each other in the row direction. Correspondingly, the panel-side image input terminal portions 124A connected to the unit circuits 130a of the straight array circuit portion 39 via the second column connection wires 137 are arranged with an interval therebetween in the row direction across the center line. That is, the plurality of panel-side image input terminal portions 124A disposed side by side along the row direction are disposed in two groups of panel-side image input terminal portions 124A with an interval therebetween in the row direction across the center line. This arrangement of the panel-side image input terminal portions 124A is preferable when a driver 121 is used that is of a type including two groups of driver-side output terminal portions (not illustrated). Of the unit circuits 130a of the pair of diagonally arrayed circuit portions 138, the second column connection wires 137 connected to the unit circuits 130a adjacent to the straight array circuit portion 39 include the second diagonally extending portions 137a which are disposed in parallel with the second diagonally extending portions 137a of the second column connection wires 137 connected to the unit circuits 130a of the straight array circuit portion 39.

The layout concerning the second column connection wires 137 and the panel-side image input terminal portions 124A may be modified as follows. Referring to FIG. 15, the second column connection wires 137 connected to the unit circuits 130a of the straight array circuit portion 39 include the second diagonally extending portions 137a provided on the left side and the right side with respect to the center line illustrated in FIG. 15. The second diagonally extending portions 137a are inclined such that the closer the second diagonally extending portions 137a become to the panel-side image input terminal portions 124A, the closer the second diagonally extending portions 137a become to each other in the row direction. Correspondingly, the plurality of panel-side image input terminal portions 124A include those connected to the unit circuits 130a of the straight array circuit portion 39 via the second column connection wires 137, and those connected to the unit circuits 130a of the pair of diagonally arrayed circuit portions 138 via the second column connection wires 137, where the panel-side image input terminal portions 124A are disposed side by side linearly along the row direction at approximately regular intervals in a single group. This arrangement of the panel-side image input terminal portions 124A is preferable when the driver 121 is used that does not include a plurality of groups of driver-side output terminal portions (not illustrated). While the present embodiment may be considered to substantially correspond to the configuration illustrated in FIG. 4, the present configuration may be adopted when it is beneficial to provide the straight array circuit portion 39 including a very small number of unit circuits 130a in order to obtain a wiring layout suitable for the driver 121. Thus, the present embodiment is preferable for handling various configurations of the driver 121.

As described above, according to the present embodiment, a pair of diagonally arrayed circuit portions 138 are disposed with an interval therebetween in the row direction, where the plurality of unit circuits 130a are arrayed symmetrically. The pair of diagonally arrayed circuit portions 138 include the straight array circuit portion 39 which are interposed between the pair of diagonally arrayed circuit portions 138 in the row direction. The straight array circuit portion 39 includes at least some of the plurality of unit circuits 130a of the second column circuit portion 130 that are arranged linearly side by side along the row direction. In this way, the arrangement freedom concerning the plurality of panel-side image input terminal portions 124A that are connected to the plurality of unit circuits 130a of the straight array circuit portion 39, and the layout freedom concerning the plurality of second column connection wires 137 connected to the plurality of unit circuits 130a of the straight array circuit portion 39 are both increased. For example, the plurality of panel-side image input terminal portions 124A can be arranged at regular intervals along the row direction, or the plurality of panel-side image input terminal portions 124A can be arranged in two groups via an interval in the row direction. In accordance with the arrangement of the panel-side image input terminal portions 124A, the layout of the plurality of second column connection wires 137 can be modified as appropriate. In this way, a variety of components connected to the plurality of panel-side image input terminal portions 124A can be handled in a preferable manner.

<Third embodiment>

A third embodiment of the present invention will be described with reference to FIG. 16 or FIG. 17. In the third embodiment, a modification of the configuration of second column circuit portions 230 and the like from the second embodiment will be described. Redundant descriptions of structures, operations, and effects similar to those of the second embodiment will be omitted.

Figure 16:
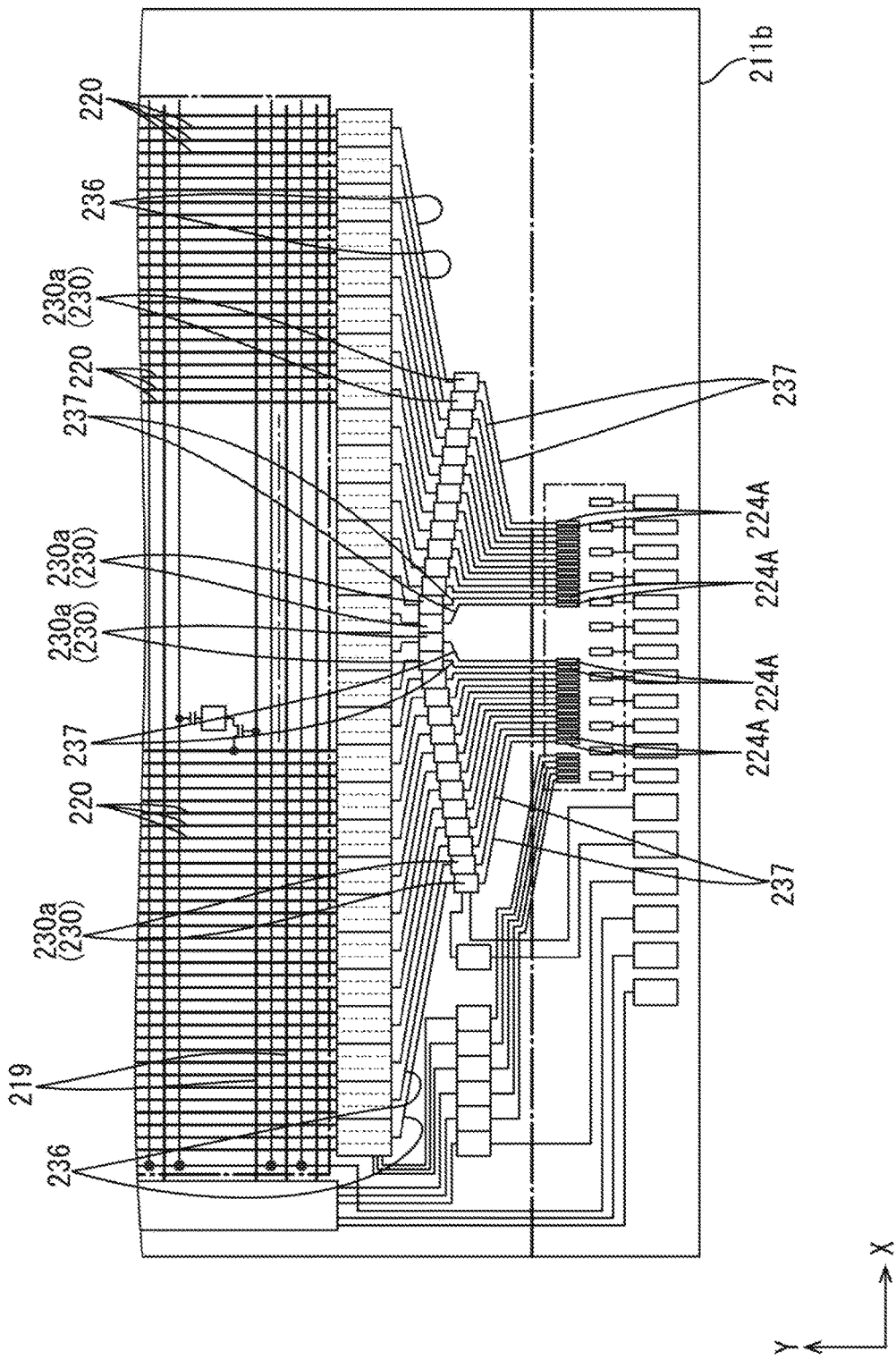
FIG. 16 is a plan view illustrating a configuration of wires and the like in a portion of an array substrate according to the third embodiment of the present invention in which a driver and a flexible substrate are mounted.
Figure 17:
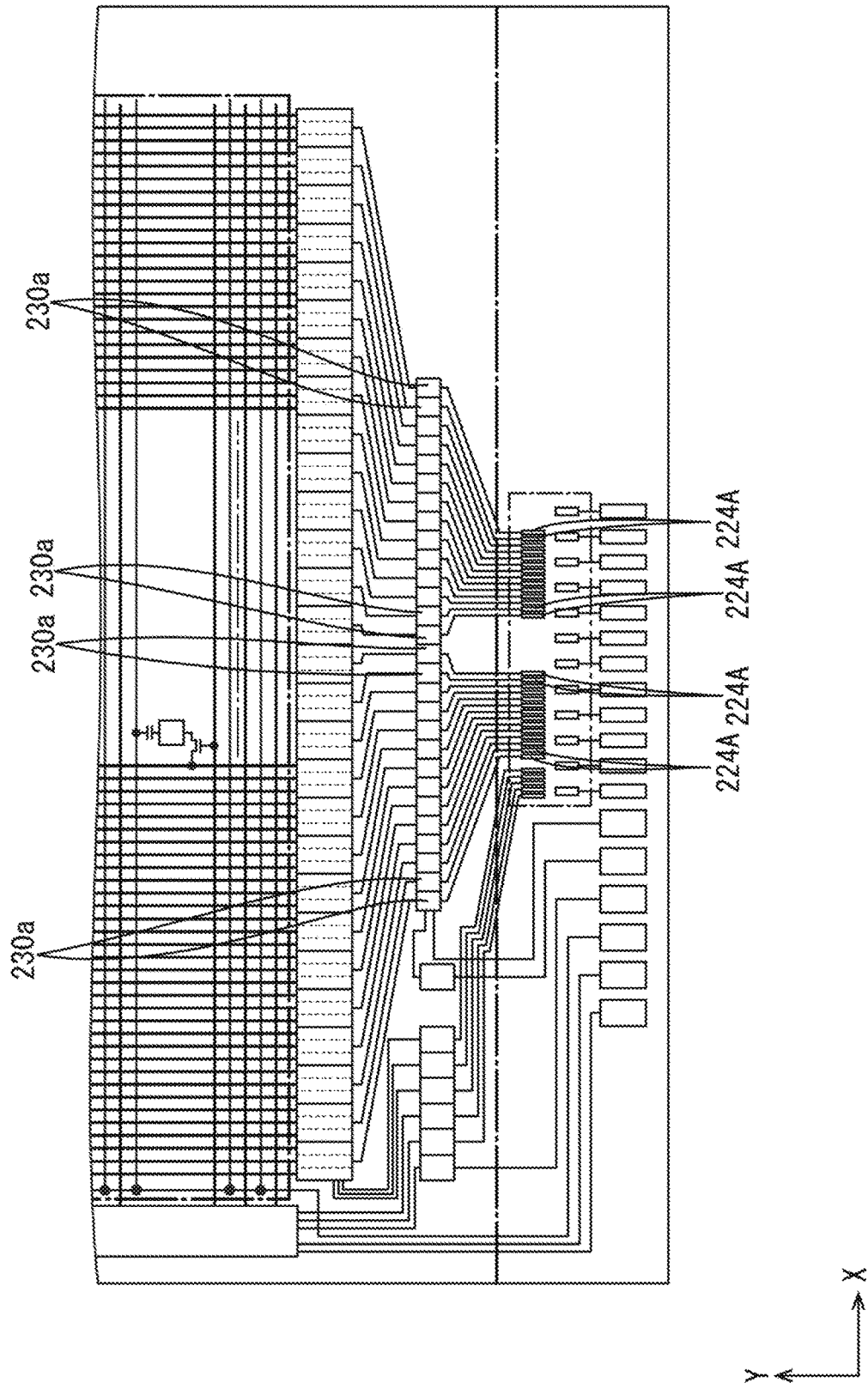
FIG. 17 is a plan view illustrating a configuration of wires and the like in a portion of the array substrate according to a comparative example of the third embodiment in which a driver and a flexible substrate are mounted.

The second column circuit portions 230 according to the present embodiment, as illustrated in FIG. 16, do not include the protection circuits but include the test circuits selectively. When the protection circuits are removed from the second column circuit portions 230, the circuit configuration of unit circuits 230a of the second column circuit portions 230 can be simplified, so that the column direction size of the second column circuit portions 230 can be further decreased. Accordingly, a decrease in frame size of the array substrate 211b can be achieved in a more preferable manner.

As illustrated in FIG. 16, second column connection wires 237 connected to the unit circuits 230a of the second column circuit portions 230 are routed similarly to the second embodiment illustrated in FIG. 14. The second column connection wires 237 are made of the same first metal film as that of gate wires 219. That is, the second column connection wires 237 are made of a metal material (such as Ta or W) of which the sheet resistance is greater than source wires 220 and first column connection wires 236. The distance with respect to the column direction between the unit circuits 230a of the second column circuit portions 230 and the panel-side image input terminal portions 224A becomes shorter toward the ends in the row direction of the second column circuit portions 230, and becomes longer toward the center. On the other hand, as illustrated in FIG. 17, for example, when the plurality of unit circuits 230a are arrayed straight along the row direction, the distance with respect to the column direction between the unit circuits 230a and the panel-side image input terminal portions 224A becomes constant. In comparison to such configuration, the second column connection wires 237 according to the present embodiment, as illustrated in FIG. 16, have longer creepage distance toward the center in the row direction of the second column circuit portions 230, from the panel-side image input terminal portions 224A to the unit circuits 230a. Accordingly, even if a surge current is input to the panel-side image input terminal portions 224A, the surge current would flow through the second column connection wires 237 with high sheet resistance and longer creepage distance, and can be sufficiently attenuated before reaching the second column circuit portions 230. In this way, while in the configuration the second column circuit portions 230 do not include the protection circuits and include the test circuits selectively, the function for protecting the second column circuit portions 230 can be obtained. Because the second column connection wires 237 provide the function of protecting the second column circuit portions 230, the need for providing a protection circuit separately from the second column connection wires 237 is eliminated. Accordingly, a decrease in frame size of the array substrate 211b can be achieved in a preferable manner.

As described above, according to the present embodiment, the second column circuit portions 230 include either the test circuits or the protection circuits. In this way, the column direction size of the second column circuit portions 230 can be further decreased in a preferable manner, whereby a decrease in frame size of the array substrate 211b can be achieved in a preferable manner.

The second column circuit portions 230 include the test circuits selectively, and the second column connection wires 237 are made of a material with a higher resistance value than the first column connection wires 236. Because the second column connection wires 237 are made of a material with a higher resistance value than the first column connection wires 236, even if a surge current is input to the panel-side image input terminal portions 224A, the surge current would flow through the second column connection wires 237 and can be sufficiently attenuated before reaching the second column circuit portions 230. Accordingly, in the configuration in which the second column circuit portions 230 do not include the protection circuits and include the test circuits selectively, the function for protecting the second column circuit portions 230 can be obtained. Because the second column connection wires 237 provide the function for protecting the second column circuit portions 230, there is no need to provide a protection circuit separately from the second column connection wires 237. Thus, a decrease in frame size of the array substrate 211b can be achieved in a preferable manner.

<Fourth embodiment>

A fourth embodiment of the present invention will be described with reference to FIG. 18. In the fourth embodiment, a modification of the configuration of first column circuit portions 329 and second column circuit portions 330 from the second embodiment will be described. Redundant descriptions of structures, operations, and effects similar to those of the second embodiment will be omitted.

Figure 18:
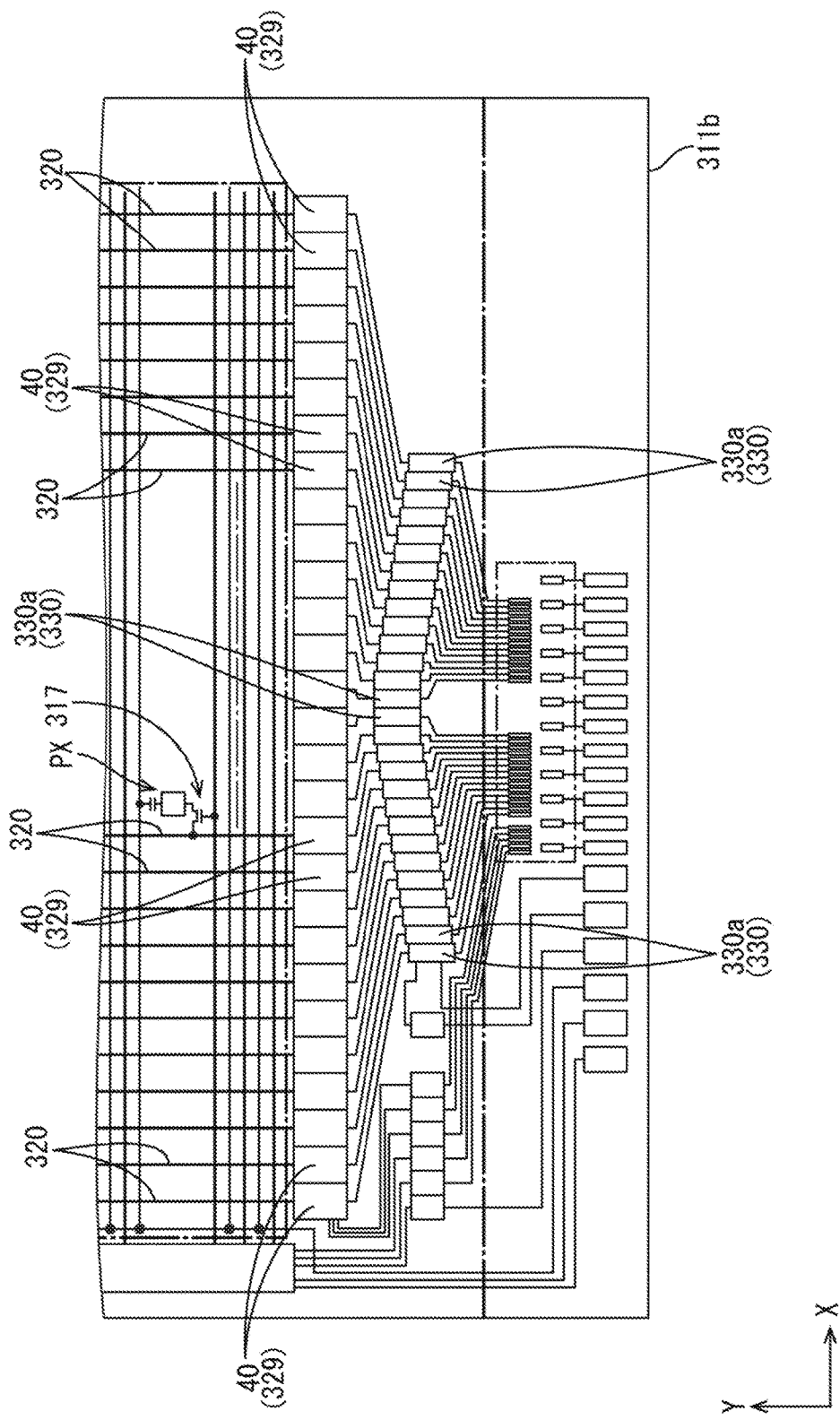
FIG. 18 is a plan view illustrating a configuration of wires and the like in a portion of an array substrate according to the fourth embodiment of the present invention in which a driver and a flexible substrate are mounted.

The first column circuit portions 329 according to the present embodiment, as illustrated in FIG. 18, include the test circuits, while the second column circuit portions 330 include the protection circuits. Thus, neither the first column circuit portions 329 nor the second column circuit portions 330 include the switch circuit described in the first embodiment. Accordingly, unit circuits 40 associated with the test circuits of the first column circuit portions 329 are separately disposed in correspondence to the respective source wires 320, and are disposed side by side linearly along the row direction. The first column circuit portions 329 and the second column circuit portions 330, neither of which include the switch circuit, have a gentle discrete change concerning the row direction size and the column direction size in the unit circuits 40, 330a, so that a decrease in the row direction size does not readily lead to an increase in the column direction size. Accordingly, the arrangement space for the first column circuit portions 329 and the second column circuit portions 330 with respect to the column direction is decreased, which is more preferable in achieving a decrease in frame size of the array substrate 311b. The configuration in which neither the first column circuit portions 329 nor the second column circuit portions 330 include the switch circuit is preferable when amorphous silicon is used as the semiconductor film material of TFTs 317 of the pixels PX.

As described above, according to the present embodiment, the first column circuit portions 329 include the test circuits configured to supply a test signal to the plurality of pixels PX, whereas the second column circuit portions 330 include the protection circuits for protecting the first column circuit portions 329 from surge current. In this way, because the test circuits and the protection circuits both tend to have a gentle discrete change concerning the row direction size and the column direction size, a decrease in the row direction size does not readily lead to an increase in the column direction size. Because the protection circuits are included in the second column circuit portions 330, the space on the outside in the row direction with respect to the second column circuit portions 330 of the array substrate 311b can be effectively utilized. In addition, the arrangement space for the second column circuit portions 330 with respect to the column direction can be decreased. Accordingly, a decrease in frame size of the array substrate 311b can be achieved in a preferable manner. On the other hand, the column direction size of the first column circuit portions 329 including the test circuits is also maintained sufficiently small, whereby a decrease in frame size of the array substrate 311b can be achieved in a preferable manner.

<Other embodiments>

The present invention is not limited to the above embodiments explained in the above description and described with reference to the drawings. The following embodiments may be included in the technical scope of the present invention, for example.

(1) In the foregoing embodiments, the protection circuit portion has been described by way of example as being arranged side by side along the row direction with respect to the second column circuit portion. It is also possible, however, to arrange wires for a sensor circuit used when installing a sensor, or a manufacturing control pattern (such as a characteristic evaluation pattern, barcode or symbols for identification, or an alignment mark), for example.

(2) In the foregoing embodiments, the protection circuit portion has been described by way of example as being arranged side by side along the row direction with respect to the second column circuit portion. It is also possible, however, to adopt an arrangement in which the protection circuit portion is shifted toward the first column circuit portion in the column direction with respect to the second column circuit portion, or shifted toward the opposite side from the first column circuit portion with respect to the column direction.

(3) In the foregoing embodiments, the protection circuit portion has been described by way of example as being arranged side by side on the row circuit portion side along the row direction with respect to the second column circuit portion. It is also possible, however, to arrange the protection circuit portion side by side along the row direction on the opposite side from the row circuit portion side with respect to the second column circuit portion.

(4) In the foregoing embodiments, the row direction size of the unit switches (unit circuits) of the first column circuit portion has been described as being equal to the pitch between the source wires adjacent to each other in the row direction. However, it is also possible to adopt a configuration in which the size and the pitch are not equal.

(5) In the foregoing embodiments (except for the fourth embodiment), the case has been described in which the first column circuit portion includes the switch circuits, it is also possible to incorporate another circuit in addition to the switch circuits, or to incorporate another circuit instead of the switch circuits.

(6) In the foregoing embodiments, the case has been described in which the second column circuit portion includes at least one of a test circuit and a protection circuit. However, it is also possible to incorporate another circuit in addition to at least one of the test circuit and the protection circuit. It is also possible to incorporate another circuit instead of at least one of the test circuit and the protection circuit.

(7) Other than the second embodiment described above, it is possible to modify, as appropriate, the specific number of the unit circuits of the straight array circuit portion.

(8) In the third embodiment, the configuration has been described in which the second column circuit portion includes the test circuit selectively. However, it is also possible to adopt a configuration in which the second column circuit portion includes the protection circuit selectively.

(9) In the fourth embodiment, the configuration has been described in which the first column circuit portion includes the test circuit, and the second column circuit portion includes the protection circuit. However, it is also possible to adopt a configuration in which the first column circuit portion includes the protection circuit and the second column circuit portion includes the test circuit. In this case, it is preferable to select and use a metal material having high sheet resistance as the metal material of the second column connection wires, as in the third embodiment.

(10) It is also possible to combine the configuration of the third or fourth embodiment with the configuration of the first embodiment.

(11) In the foregoing embodiments, the liquid crystal panel of the COG mount type has been described by way of example in which the driver is directly mounted on the array substrate. However, it also possible to apply the present invention in a liquid crystal panel of the chip-on-film (COF) mount type in which the driver is mounted on the flexible substrate and the flexible substrate is mounted on the array substrate.

(12) In the foregoing embodiments, the row circuit portion is provided at the end portion on one of the long sides of the array substrate. However, the row circuit portion may be provided at the end portion on the other of the long sides of the array substrate. It is also possible to apply the present invention in a configuration in which a pair of row circuit portions are provided at the end portions of a pair of long sides of the array substrate. In this case, it is preferable to connect the gate wires disposed side by side along the column direction to one row circuit portion and the other row circuit portion alternately.

(13) Other than the foregoing embodiments, it is possible to modify, as appropriate, the specific arrangement of each of the terminal portions or the specific routing path of the individual wires.

(14) In the foregoing embodiments, the liquid crystal panel with the three-color pixel configuration of red, green, and blue has been described by way of example. However, it is possible to apply the present invention in a liquid crystal panel provided with the four-color pixel configuration of yellow and the like in addition to red, green, and blue. In this case, in the configuration in which the first column circuit portion includes the switch circuit, the unit switches may be arranged in association with the four colors of pixels.

(15) In the foregoing embodiments, the configuration has been described in which the TFTs, the column control circuit portion, and the row control circuit portion include a CG silicon thin film as a semiconductor film. However, it is also possible to use a semiconductor film including amorphous silicon or an oxide semiconductor, for example.

(16) In the foregoing embodiments, the liquid crystal panel with an elongated quadrangular shape has been described by way of example. However, it is possible to apply the present invention in a liquid crystal panel with an oblong quadrangular shape or a liquid crystal panel with a square shape. It is also possible to apply the present invention in a liquid crystal panel with a circular shape or an elliptical shape.

(17) The present invention includes configurations in which a functional panel, such as a touch panel or a parallax barrier panel (switch liquid crystal panel), is laminated and attached to the liquid crystal panel described in each of the foregoing embodiments.

(18) In the foregoing embodiments, as the backlight device with which the liquid crystal display device is equipped, an edge light type has been described by way of example. However, the present invention also includes the liquid crystal display device in which a direct backlight device is used.

(19) In the foregoing embodiments, a transmission liquid crystal display device equipped with a backlight device as an external light source has been described by way of example. However, the present invention is also applicable to a reflecting liquid crystal display device that performs a display using external light. In this case, the backlight device may be omitted. It is also possible to apply the present invention in a semi-transmissive liquid crystal display device.

(20) In the foregoing embodiments, TFTs are used as the switching elements of the liquid crystal display device. However, the present invention may be applied in a liquid crystal display device using switching elements other than TFT (such as a thin film diode (TFD)). It is also possible to apply the present invention in a liquid crystal display device that provides a black and white display, as well as a liquid crystal display device that provides a color display.

(21) In the foregoing embodiments, the liquid crystal display device in which a liquid crystal panel is used as the display panel has been described by way of example. However, it is also possible to apply the present invention in display devices in which other types of display panel is used, such as a plasma display panel (PDP), an organic EL panel, an electrophoretic display panel (EPD), or a micro electro mechanical systems (MEMS) display panel.

(22) in the foregoing embodiments, the case has been described by way of example in which a liquid crystal panel classified as being small-sized or medium-small size is manufactured. However, it is also possible to apply the present invention when manufacturing a liquid crystal panel of the screen size of 20 inches to 90 inches that is classified as being middle-sized or large-sized (extra-large sized). In this case, the liquid crystal panel may be used in electronic devices such as a television receiver device, an electronic signboard (digital signage), and an electronic blackboard.

EXPLANATION OF SYMBOLS

11: Liquid crystal panel (Display panel)
11a: CF substrate (Counter substrate)
11b, 211b, 311b: Array substrate (Active matrix substrate)
20, 220, 320: Source wires (Column wires)
22B: Non-driver external connection terminal portion (Second column control signal input portion)
24: Panel-side input terminal portion (Signal input portion)
24A, 124A, 224A: Panel-side image input terminal portion (Signal input portion)
24B: Panel-side control input terminal portion (First column control signal input portion)
29, 129, 329: First column circuit portion
29a: Unit switch
30, 130, 230, 330: Second column circuit portion
30a, 130a, 230a, 330a: Unit circuit
33: Protection circuit portion (Control wire protection circuit portion)
34: First column control wires
35: Second column control wires
36, 136, 236: First column connection wires
37, 137, 237: Second column connection wires
37a, 137a: Second diagonally extending portion (Diagonally extending portion)
38: Diagonally arrayed circuit portion
39: Straight array circuit portion
PX: Pixel

The invention claimed is:

1. An active matrix substrate comprising:
a plurality of pixels arrayed in a matrix along a row direction and a column direction;
a plurality of column wires connected to the plurality of pixels disposed side by side along the column direction;
a first column circuit portion extending along the row direction and connected to the plurality of column wires;
a plurality of first column connection wires connected to the first column circuit portion;
a second column circuit portion disposed so as to sandwich the first column circuit portion with the plurality of pixels, and including a plurality of unit circuits respectively connected to the plurality of first column connection wires;
a plurality of signal input portions disposed so as to sandwich the second column circuit portion with the first column circuit portion, and configured to input a signal to the second column circuit portion, the plurality of signal input portions including a signal input portion that is displaced in the row direction with respect to the unit circuit to be connected;
a plurality of second column connection wires respectively connected to the plurality of unit circuit of the second column circuit portion and to the plurality of signal input portions, and including at least a diagonally extending portion extending, from the unit circuit side toward the signal input portion side to be connected, along a direction intersecting the row direction and the column direction; and
at least one diagonally arrayed circuit portion including at least some of the plurality of unit circuits of the second column circuit portion being arranged side by side along a direction intersecting the row direction and the column direction, the at least one diagonally arrayed circuit portion including the plurality of unit circuits arrayed such that the closer the unit circuits on the side of the unit circuits to be connected with the diagonally extending portion become to the signal input portion side in the row direction, the closer the unit circuits become to the first column circuit portion with respect to the column direction.

2. The active matrix substrate according to claim 1, wherein
the first column circuit portion and the second column circuit portion each have a correlation such that a size in the row direction and a size in the column direction are discretely inversely proportional to each other, and the second column circuit portion has a relatively gentler discrete change concerning the row direction size and the column direction size than the first column circuit portion.

3. The active matrix substrate according to claim 1, wherein the first column circuit portion includes a switch circuit for allocating a signal to the plurality of column wires respectively connected the plurality of pixels disposed side by side along the row direction.

4. The active matrix substrate according to claim 3, wherein
the switch circuit comprises a. plurality of unit switches disposed side by side linearly along the row direction, and
the unit switches have a size in the row direction that is equal to a pitch between the plurality of pixels disposed side by side along the row direction.

5. The active matrix substrate according to claim 1, 4, wherein the second column circuit portion includes at least e of a test circuit configured to supply a test signal to the first column circuit portion, and a protection circuit for protecting the first column circuit portion from a surge current.

6. The active matrix substrate according to claim 5, wherein the second column circuit portion includes both the test circuit and the protection circuit.

7. The active matrix substrate according to claim 5, wherein the second column circuit portion includes one of the test circuit and the protection circuit.

8. The active matrix substrate according to claim 7, wherein
the second column circuit portion includes the test circuit selectively, and
the second column connection wires are made of a material with a higher resistance value than the first column connection wires.

9. The active matrix substrate according to claim 1, wherein
the first column circuit portion includes a test circuit configured to supply a test signal to the plurality of pixels, and
the second column circuit portion includes a protection circuit for protecting the first column circuit portion from a surge current.

10. The active matrix substrate according to claim 1, wherein
the at least one diagonally arrayed circuit portion includes a pair of diagonally arrayed circuit portions with an interval therebetween in the row direction,
the plurality of unit circuits are arrayed symmetrically, and
a straight array circuit portion interposed between the pair of diagonally arrayed circuit portions with respect to the row direction, wherein at least some of the plurality of unit circuits of the second column circuit portion are arranged linearly side by side along the row direction.

11. The active matrix substrate according to claim 1, further comprising:
a first column control wire which is connected to the first column circuit portion and to Which a first column control signal is transmitted;
a first column control signal input portion which is connected to the first column control wire and to which the first column control signal is input;
a second column control wire which is connected to the second column circuit portion and to which a second column control signal is transmitted;
a second column control signal input portion which is connected to the second column control wires and to which the second column control signal is input; and
a control wires protection circuit portion which is provided along the routing of the first column control wire and the second column control wire to protect the first column circuit portion and the second column circuit portion from a surge current, the control wire protection circuit portion being disposed side by side along the row direction with respect to the second column circuit portion.

12. A display panel comprising:
the active matrix substrate according to claim 1; and
a counter substrate bonded to the active matrix substrate.

* * * * *